(12) United States Patent
Mokri et al.

(10) Patent No.: US 9,361,713 B2
(45) Date of Patent: Jun. 7, 2016

(54) SYSTEMS AND METHODS FOR ANALYZING GRAPHS AND/OR PHYSICAL BODIES

(71) Applicant: Masdar Institute Of Science And Technology, Abu Dhabi (AE)

(72) Inventors: Alaeddine Mokri, Abu Dhabi (AE); Mahieddine Emziane, Abu Dhabi (AE)

(73) Assignee: Masdar Institute of Science and Technology, Abu Dhabi (AE)

( * ) Notice: Subject to any disclaimer, the term of this patent is extended or adjusted under 35 U.S.C. 154(b) by 246 days.

(21) Appl. No.: 13/932,550

(22) Filed: Jul. 1, 2013

(65) Prior Publication Data

US 2013/0293552 A1 Nov. 7, 2013

Related U.S. Application Data

(63) Continuation-in-part of application No. 13/459,996, filed on Apr. 30, 2012, now abandoned.

(51) Int. Cl.
| | |
|---|---|
| *G06T 11/20* | (2006.01) |
| *G06F 3/0354* | (2013.01) |
| *G06F 3/038* | (2013.01) |
| *G06F 3/0484* | (2013.01) |

(52) U.S. Cl.
CPC .............. *G06T 11/206* (2013.01); *G06F 3/038* (2013.01); *G06F 3/0354* (2013.01); *G06F 3/03543* (2013.01); *G06F 3/0484* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 5,994,710 | A  * | 11/1999 | Knee et al. .................... | 250/557 |
| 6,115,028 | A  * | 9/2000 | Balakrishnan et al. ........ | 345/157 |
| 6,164,808 | A  * | 12/2000 | Shibata et al. ................. | 700/85 |
| 6,292,174 | B1 * | 9/2001 | Mallett et al. ................. | 345/163 |
| 7,567,697 | B2 * | 7/2009 | Mostafavi ..................... | 382/131 |
| 8,326,662 | B1 * | 12/2012 | Byrne et al. ................. | 705/7.11 |
| 2003/0052881 | A1 * | 3/2003 | Otagiri ......................... | 345/440 |
| 2004/0070564 | A1 * | 4/2004 | Dawson et al. ............... | 345/156 |
| 2006/0010427 | A1 * | 1/2006 | Hoffman ....................... | 717/124 |
| 2007/0273645 | A1 * | 11/2007 | Bang et al. .................... | 345/157 |
| 2008/0306985 | A1 * | 12/2008 | Murray et al. ................ | 707/102 |
| 2010/0033428 | A1 * | 2/2010 | Ahn et al. ..................... | 345/157 |
| 2010/0231596 | A1 * | 9/2010 | Matsuda ....................... | 345/440 |
| 2014/0022256 | A1 * | 1/2014 | Carnes et al. ............... | 345/440.1 |

FOREIGN PATENT DOCUMENTS

| | | | |
|---|---|---|---|
| WO | 2010015031 A1 | 2/2010 | |
| WO | WO 2010015031 A1 * | 2/2010 | ................ G06F 3/01 |

OTHER PUBLICATIONS

US Office Action mailed Jun. 20, 2014, received in related U.S. Appl. No. 13/459,996, pp. 1-18.

(Continued)

*Primary Examiner* — David H Chu
(74) *Attorney, Agent, or Firm* — Grossman Tucker Perreault & Pfleger, PLLC

(57) ABSTRACT

Systems and methods for analyzing graphs and/or physical bodies are described. In some embodiments, the systems and methods determine one or more scaling factors that may be subsequently used to extract data from a graph/body under consideration. The systems and methods may also enable data extraction from multiple graphs, providing avenues to simultaneously optimize multiple variables at the same time.

24 Claims, 14 Drawing Sheets

(56) References Cited

OTHER PUBLICATIONS

"MagicPlan Questions and Answers", http://wwe.sensopia.com/english/support.html, Oct. 2011.

"MagicPlan: Point and Tap to Map Your Entire Home", http://iphone.appstorm.net/reviews/lifestyle/magicplan-point-and-tap-to-map-your-entire-home, Jun. 2011.

* cited by examiner

SYSTEMS AND METHODS FOR ANALYZING GRAPHS AND/OR PHYSICAL BODIES

CROSS REFERENCE TO RELATED APPLICATIONS

This application is a continuation in part of U.S. application Ser. No. 13/459,996, filed Apr. 30, 2012, the entire content of which is incorporated herein by reference.

BACKGROUND

Scientists and engineers frequently utilize charts, graphs and the like (collectively, "graphs") to present and interpret data. In many cases, one or more graphs are included in a scientific document, such as a journal article, book, research paper, or the like. While presenting data in a graph can be useful for justifying conclusions or observations presented in the document, subsequent use of graph by other researchers can be difficult.

For example, a scientist or engineer may wish to use a printed copy of a graph to assist with their research or to further analyze the information presented in a publication in which the graph is included. To this end, the scientist or engineer might use rudimentary implements such as a pencil and ruler to read individual data points from the printed graph. This method can be time consuming and inaccurate, and does not allow mathematical operations (e.g., surface area under a curve, the distance between two points, extrapolation, interpolation, etc.) to be easily and rapidly performed on the data represented by the printed graph.

With the advent of modern computing techniques, scientific publications are increasingly being produced and distributed electronically. Like their hard copy counterparts, electronic publications frequently include graphs. Likewise, mechanisms exist for scanning an image of a printed graph into an electronic format. Thus, electronic images of graphs are now widely produced and distributed in any number of image file formats. For simplicity, a graph that is presented electronically is referred to herein as an "electronic graph."

Like printed graphs, a scientist or engineer may have difficulty analyzing or using electronic graphs. In many cases, an electronic graph is provided as an image file that does not include the raw data utilized to generate the electronic graph. As a result, it may be difficult to obtain accurate data from the electronic graph itself. Although digitization programs exist to convert an electronic graph to raw data, such programs can be expensive and can take significant time to execute. They may also lack certain functionality, such as the ability to perform on the fly calculations on data represented in an electronic graph.

Graphs encountered in engineering and the sciences often have two independent axes (i.e., two variables). Graphs with greater than two axes can be difficult to produce, and can be more difficult to extract data from than a two dimensional graph. This can be a significant hindrance in fields where the analysis and/or optimization of greater than two variables is desired.

In addition, engineers may wish to take measurements of certain characteristics, such as a distance (length), acceleration, pressure, velocity, the dimensions of an object, the volume of an object, etc. Although tools exist to make such measurements, they may not be electronic and thus, may not be as accurate as an electronic measurement device. In instances where electronic tools are available, it may be necessary to use one or more of such tools to obtain desired data.

Finally, people often use mobile computing devices such as laptop computers to perform computing tasks away from an office environment. Although laptop computers generally include a track pad or button for controlling a digital pointer, a user may find such input devices difficult to use, relative to a traditional computer mouse. As a result, such users may carry a portable mouse with them for use with their mobile computing device. Although the mouse provides the desired functionality, it may be inconvenient for the user to carry additional devices.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
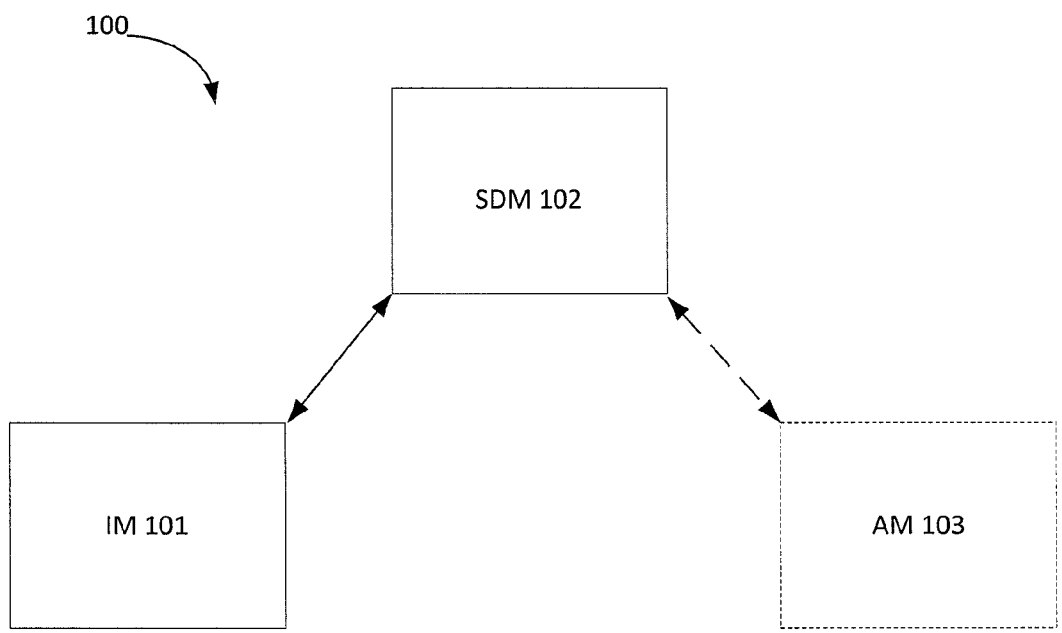
FIG. 1 is a block diagram of an exemplary system in accordance with the present disclosure.

As used herein, the terms "physical body" and "body" are interchangeably used to refer to a physical object. Although three dimensional objects are particularly envisioned, largely two dimensional objects such as paper are also considered within the scope of the present disclosure.

As used herein, the term, "graph" means data or other information that has been presented in a graphical format, such as a chart, a plot, a graph, combinations thereof, and the like. For the sake of illustration, the present disclosure focuses on the extraction of data from two-dimensional graphs, i.e., graphs with two independent axes each representing one of two variables. However, it should be understood that the systems and methods of the present disclosure are not limited to graphs having two dimensions. Indeed, graphs in any format and illustrating any number of variables may be used. While the present disclosure focuses in part on the analysis and use of printed (i.e., hard copy) graphs, the systems and methods described herein may also be used with electronic graphs, i.e., graphs in electronic format, e.g., as one or more images.

While the present disclosure focuses on the analysis of graphs, embodiments in which physical bodies are analyzed are also contemplated. Accordingly, descriptions herein of how the systems of the present disclosure may be applied to analyze graphs should be considered as equally applying to the analysis of a physical body.

As used herein, the term, "module" includes but is not limited to hardware, circuitry, firmware, software, and/or a combination thereof to perform function(s) and/or action(s) consistent with the present disclosure. Non-limiting examples of hardware include processors, microprocessors, circuits, circuit elements (e.g., transistors, resistors, capacitors, inductors, and so forth), integrated circuits, application specific integrated circuits (ASIC), programmable logic device (PLD) logic gates, registers, semiconductor devices, chips, microchips, chipsets, displays, sensors and so forth. Software components of the modules described herein may take the form of a software package, code, and/or instructions that may be executed by one or more processors. The software components may be accessed locally or remotely through Internet, Intranet, or otherwise. "Circuitry" is used herein to mean, singly or in any combination, hardwired circuitry, programmable circuitry, state machine circuitry, and/or firmware that stores instructions executed by programmable circuitry.

Certain elements and embodiments of the present disclosure may take the form of a computer-readable medium having processor-executable instructions stored thereon, which when executed by a processor cause the processor to perform stated functions. Examples of computer-readable media include but are not limited disks, such as floppy disks, optical disks, compact disk read-only memories (CD-ROMs), compact disk rewritables (CD-RWs), magnetic recording media, magneto-optical disks, semiconductor devices such as read-only memories (ROMs), random access memories (RAMs) (e.g., dynamic and/or static RAMs), erasable programmable read-only memories (EPROMs), electrically erasable programmable read-only memories (EEPROMs), solid state memories (e.g., flash), magnetic or optical cards, or any type of tangible media suitable for storing electronic instructions. The instructions may include any suitable type of code and may be implemented using any suitable programming language One or more elements of the present disclosure may form all or a part of a computing device. Exemplary computing devices include but are not limited desktop computers, laptop computers, smart phones, cell phones, tablet personal computers, personal data assistants, combinations thereof, and the like. For the sake of brevity, such devices are collectively referred to herein as a "computer" or "computing device." Such computing devices may include any suitable processing platform, device or system, any suitable computing platform, device or system and may be implemented using any suitable combination of hardware and/or software.

One aspect of the present disclosure relates to systems for analyzing graphs and/or physical bodies. In general, such systems include at least one input module ("IM") and at least one synchronization and display module ("SDM"). The systems may optionally further include at least one analysis module ("AM"). In this regard, reference is made to FIG. 1, which depicts an exemplary system in accordance with the present disclosure. As shown, system 100 includes input module ("IM") 101 and synchronization and display module (SDM) 102. Analysis module ("AM") 103 may also be included, and is shown with hashed markings to indicate its optional status.

IM 101 can function to provide the physical position of at least one input device to SDM 102. As the input device is moved, SDM 102 can monitor the position of the input device, as well as the position of a digital pointer that is rendered on a display. SDM 102 can then determine one or more scaling factors that can be used to scale the movement of the digital pointer to the movement of the input device. Once SDM 102 has determined such scaling factor(s), data may be extracted from a graph/body under consideration. Data extraction may occur, for example, by tracing or otherwise following features of the graph/body with an input device and/or the digital pointer, and applying the scaling factor(s) to convert the position of the input device/digital pointer to corresponding data values. Synchronously or asynchronously with such data extraction, optional AM 103 may perform one or more mathematical calculations on the extracted data.

Figure 2A:
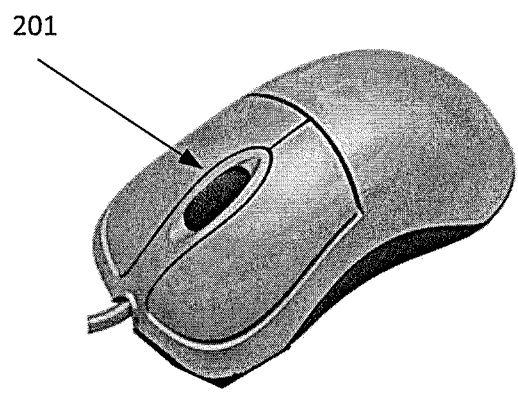
FIG. 2A depicts an exemplary input device in accordance with the present disclosure.
Figure 2B:
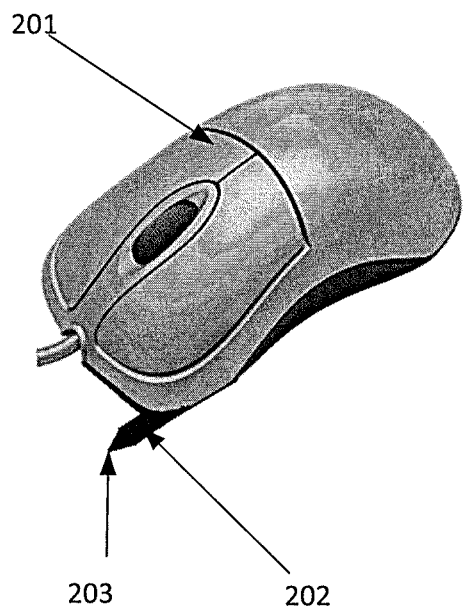
FIG. 2B depicts an exemplary input device including a pointer in accordance with the present disclosure.

IM 101 can include or be incorporated into at least one input device. While the present disclosure focuses in part on the use of a computer mouse as an input device, it should be understood that any device that is capable of physically tracing or otherwise following features of a graph may be used. Non-limiting examples of suitable input devices include a computer mouse, a trackball, a touchpad, a touch screen, a stylus, a game controller, a gamepad, a paddle, a joystick, a remote control, a video input device (e.g., web camera, digital camera, etc.), a smart phone, a tablet personal computer, a laptop computer, a personal data assistant, combinations thereof, and the like. In non-limiting embodiments, and as illustrated in FIGS. 2A and 2B, IM 101 includes mouse 201 as an input device. In other non-limiting embodiments, IM 101 includes or is incorporated into a case or other attachment for a smart phone, tablet personal computer, laptop computer, personal data assistant. In such instances, the case or other attachment may individually function as an input device and/or may function as an input device in conjunction with the device to which it is attached (e.g., the smart phone). In any case, the graph under consideration may be provided, for example, as an image on a mouse pad or other surface over which the input device may be moved.

The input devices of the present disclosure may include one or more features to enhance accuracy and/or to aid in the tracing of features of a graph under consideration. Non-limiting examples of such features include pointers, cross hairs, markings, light sources (e.g., a laser, a light emitting diode, a light bulb, etc.) providing marking indicia such as a line, a spot, a cross, etc., combinations thereof, and the like. FIG. 2B shows a non-limiting illustration of this concept, wherein an input device (in this case, mouse 201) is equipped with targeting device 202. In this embodiment, targeting device 202 is configured as a sharp pointer integral with or attached to the body of mouse 201. In operation, all or a portion of targeting device 202 (e.g., tip 203) may be used to trace or otherwise follow features of a graph under consideration while physically moving mouse 201. FIG. 10B provides another illustration of this concept, wherein attachment 1001 is equipped with targeting device 1006, which functions in much the same manner as targeting device 202. Alternatively or additionally, in instances where attachment 1001 is an attachment for a smart phone, data from sensors within the smart phone (gyroscope, GPS, accelerometer, pressure, temperature, humidity, compass, proximity sensor, light sensor, microphone, combinations thereof, and the like), may be leveraged to increase measurement accuracy and/or to provide additional functionality.

Figure 2C:
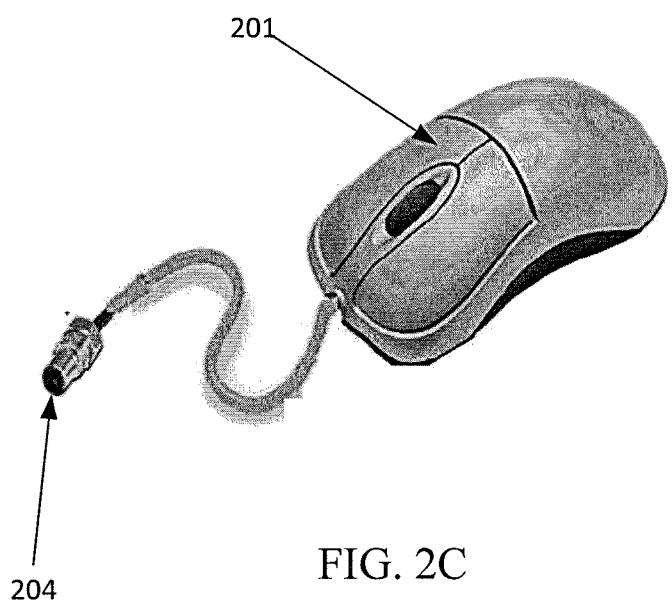
FIG. 2C depicts an exemplary input device including an optical sensor in accordance with the present disclosure.

FIG. 2C depicts yet another example of an input device that includes features to enhance accuracy and/or aid in the tracing features of a graph or physical body. In this embodiment, optical sensor 204 is attached to mouse 201 by way of a cable, not labeled. Sensor 204 may be moved over a graph or object in question in much the same manner as mouse 201 including pointer 203 may be moved. Although not explicitly illustrated, attachment 1001 in FIGS. 10A and 10B may be similarly equipped. Alternatively or additionally, where the input device is a smart phone or other mobile computing device that intrinsically includes an optical sensor, such sensor may be used to trace or otherwise analyze the features of a graph or physical body.

In general, IM 101 can function to send one or more signals indicative of the position and/or movement of the input device to SDM 102. Communication between IM 101 and SDM 102 may occur in any suitable manner, using any suitable communications interface. For example, IM 101 and SDM 102 may be in wired or wireless communication with one another. In the former case, IM 101 and SDM 102 may communicate, for example, using the well-known universal serial bus (USB) and/or personal system 2 (PS/2) interfaces. In the latter (wireless) case, IM 101 and SDM 102 may communicate via one or more wireless communication interfaces, such as a wireless network, a personal area network, a BLUETOOTH™ network, near field communication (NFC), radio frequency communication, combinations thereof, or the like. In such instances, IM 101 may be configured to wirelessly pair with SDM 102 or an electronic device including SDM 102 using any suitable wireless pairing protocol.

IM 101 may communicate information about the input device's position and/or movement in a number of different ways. For example, IM 101 may communicate signals to SDM 102 that include one or more indicators of the position of the input device, e.g., physical coordinates corresponding to the position of the input device at a set time. Such coordinates may be, for example, X and Y coordinates of a two dimensional Cartesian coordinate system. Alternatively or additionally, IM 101 may transmit signals that are indicative of the movement of the input device in two dimensions, but which may not correspond to a specific physical location. For example, IM 101 may transmit signals indicating movement and/or speed of the input device in a particular direction, which may be applied to cause a digital pointer to move in a corresponding fashion.

In some embodiments IM 101 includes machine executable input module instructions that when executed by a processor cause the processor to transmit information regarding the position and/or movement of the input device to SDM 102. Such input module instructions may, for example, take the form of one or more device drivers, system libraries, combinations thereof, and the like. Of course, such formats are exemplary only, and IM 101 may include input module instructions in any suitable form. Indeed, input module instructions in the form of one or more applications, web based applications (web-app), browser plugins, and the like are envisioned, and are suitable for use in the present disclosure.

SDM 102 can function to cause a computing system to render a graphical user interface (GUI) on a display. SDM 102 may include machine readable GUI instructions for this purpose. In such instances, the GUI instructions when executed by a computing system (or a processor thereof) cause the computing system to render a GUI on a display thereof. Such GUI instructions may take the form of an independent application that is executed by a computing system or a processor thereof. Alternatively or additionally, the GUI instructions may take the form of a web-based application, i.e., an application run within a host web browser. Thus for example, the GUI instructions may take the form of website code that is executed and/or read within a web browser. In such instances, the GUI produced by SDM 102 is referred to herein as a web-based graphical user interface (WBGUI). Regardless of its nature, the GUI may be understood to provide an interface for extracting data from a graph, reporting that data and, in some instances, displaying an image of the graph under consideration.

The GUI instructions may be coded using any suitable programming language, such as but not limited to hypertext markup language (HTML), Java™, Adobe™, Flash™ combinations thereof and the like. In non-limiting examples, SDM 102 includes machine readable instructions coded in HTML, JavaScript™ or a combination thereof, which when executed by a computing device (or processor thereof) cause a WBGUI to be rendered on a display.

Figure 3:
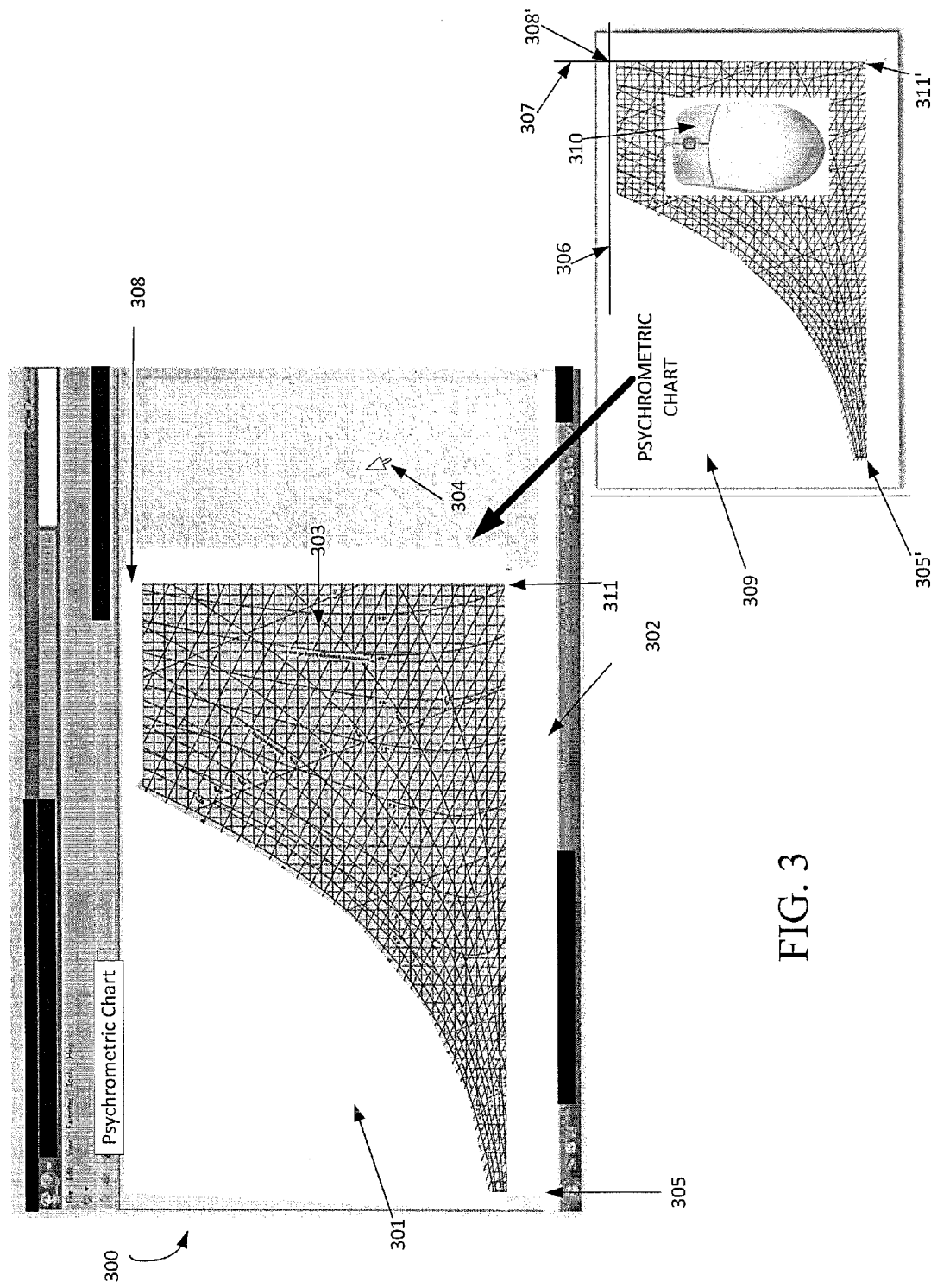
FIG. 3 illustrates a graphical user interface in accordance with the present disclosure.

FIG. 3 depicts one non-limiting example of a WBGUI consistent with the present disclosure. As shown, WBGUI 300 includes rendering area 301 and optional reporting area 302. Although not required, rendering area 301 can function to display an image 303 of a graph under consideration, in this case printed graph 309. If included, the image of the graph may be in any format, such as in .JPG, .GIF, .BMP, .PDF, .TIFF, another image format, or the like.

Figure 5:
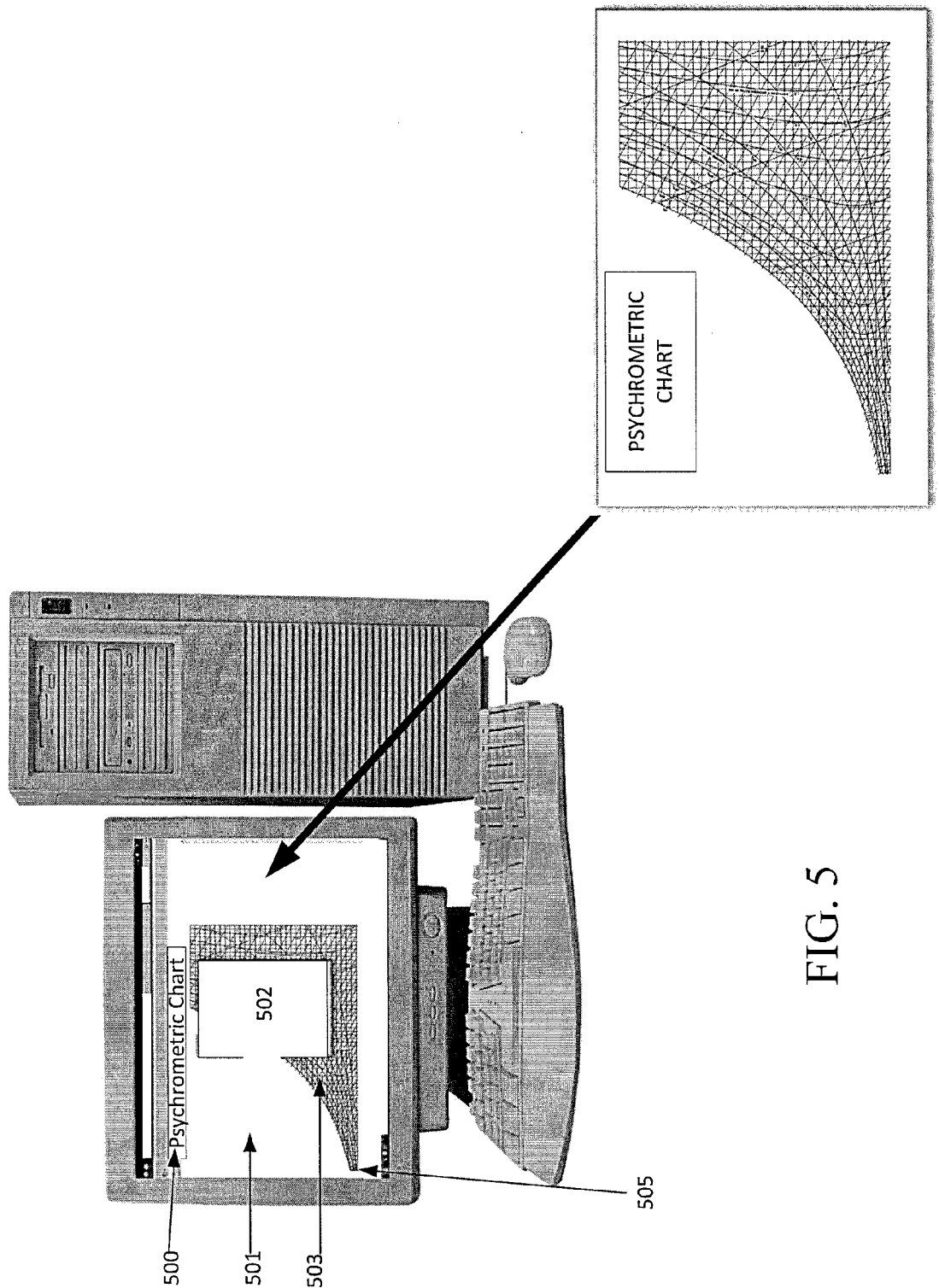
FIG. 5 illustrates an example in which a system in accordance with the present disclosure is used to extract data from a psychrometric chart.

Optional reporting area 302 may function to display information relevant to the graph under consideration. For example, reporting area 302 may display raw coordinates of digital pointer 304, data extracted from graph 309, and/or the results of an analysis performed by optional analysis module 103. While reporting area 302 is shown in FIG. 3 as a frame within WBGUI 300, such a format is not required. Indeed, reporting area 302 may be configured as an alert or pop-up window that appears in response to the selection and/or rollover of all or a portion of the graph under consideration. This concept is reflected in FIGS. 5 and 6. Alternatively or additionally, information relevant to the graph under consideration may be displayed within rendering area 301.

Digital pointer 304 is a visual or non-visual indicator that may be used to point to or otherwise reference features within a GUI, e.g., WBGUI 300. In one embodiment, and as shown in FIG. 3, digital pointer 304 may take the form of a cursor, such as a mouse cursor. This form is exemplary only, and it should be understood that digital pointer 304 may take any suitable form.

Digital pointer 304 may synchronously or asynchronously move in response to movement of input device 310. That is, as input device 310 moves in a direction, digital pointer 304 may move in the same direction within WBGUI 300. In some instances, however, digital pointer 304 may not move at the same speed as the input device. For example, digital pointer 304 may move in units corresponding to the resolution of rendering area 301 (e.g., in pixels), whereas input device 310 may move in different units. To enable data extraction from graph 310, SDM 102 can function to scale the movement of digital pointer 304 to the movement of input device 310.

More specifically, and as will be described below, SDM 102 can determine the number of pixels that digital pointer 304 moves, as input device 310 is moved by a known distance along the axes of graph 310. The relationship between the number of pixels digital pointer 304 moves relative to a known movement of input device 310 is hereinafter referred to as a "scaling factor." In some embodiments, the scaling factor is the number of pixels of rendering area 301 correlating to a unit (i.e., a known distance) reported on an axis of the graph under consideration. Once SDM 102 determines scaling factors for each axis of a graph under consideration (e.g., the x and y axes of graph 309), it may apply such factors to convert the position of input device 304 to data represented in the graph. The manner in which SDM 102 may determine and apply such scaling factors is described below, with reference to the non-limiting example shown in FIG. 3.

To determine the aforementioned scaling factor(s) for each axis of graph 309, SDM 102 may monitor the position of digital pointer 304, as input device 310 is moved along the x and y axes of graph 309 by a known distance. In some embodiments, SDM 102 monitors the position of digital pointer 304, as input device 310 traces the entire length of each axis of graph 309. After input device 310 traces each axis of graph 309, SDM 102 may determine the corresponding length of each axis in pixels (hereafter, "total pixel length) by determining the difference between the starting and ending pixel coordinates of input device 304. As noted previously, SDM 102 may receive the pixel coordinates of digital pointer 304 from IM 101. SDM 102 may then determine a scaling factor for each axis by dividing the total pixel length of an axis by the number of units reported on that axis. For example, consider a scenario in which SDM 102 determines that the total pixel length of the x axis of graph 309 is 10,000. If the x axis in this scenario includes 10 units, SDM 102 may determine through division that the scaling factor for that axis is 1000 pixels/1 unit.

Alternatively, SDM 102 may determine a scaling factor for each axis of graph 309 by determining the difference in the starting and ending pixel coordinates of digital pointer 304, as input device traces one or more units of such axes. For example, SDM 102 may monitor the pixel coordinates of digital pointer 304 as input device 310 traces the length of one or more units of the axes of graph 309, and applying the following formula:

$$SF(x,y) = \Delta P(x,y)/U(x,y)$$

where $\Delta P(x, y)$ is the difference between the starting and ending pixel coordinates of digital pointer as input device 310 is moved along the relevant axis of graph 309, U is the number of units along the relevant axis of graph 309 that input device 310 was moved, and SF (x, y) is the calculated scaling factor for the relevant axis. If the scaling factor for each axis is determined in this manner, SDM 102 may determine the total pixel length of each axis of graph 309 by multiplying the relevant scaling factor by the number of units reported on the corresponding axis. For example, if scaling factor (x) is 1000 pixels/1 unit of the x axis of graph 309, and graph 309 includes 10 units on its x-axis, the total pixel length of such axis is 10,000 pixels.

Although the foregoing discussion focuses on the derivation of a scaling factor from the total length of an axis or vice versa, it should be understood that such parameters may be independently determined. That is, SDM 102 may calculate a scaling factor for each axis by determining the number of pixels that digital pointer 304 moves in response to the movement of input device 301 by one or a subset of units of each axis of graph 309, as discussed above. In addition, the total pixel length of each axis may be determined by SDM 102 by determining the number of pixels that digital pointer 304 moves in response to the tracing of the entire length of the axes of graph 309, as also discussed above.

In any case, the scaling factor determined by SDM 102 for each axis of a graph under consideration may be associated with the scale of each unit reported on such graph. Thus, for example, if a graph plots time on the y axis versus temperature on the x axis, SF (x) may be reported in pixels/unit temperature (e.g., Celsius, Fahrenheit, etc.), and SF (y) may be reported in pixels/unit time (e.g., seconds, minutes, hours, etc.).

Once scaling factors have been determined for each axis, SDM 102 may extract data from graph 309 by determining the position (i.e., pixel coordinates) of a digital pointer relative to one or more reference points in a rendering area of a GUI, and converting the position of the digital pointer to data using the scaling factor(s) for each axis.

With respect to the reference point(s), one or more locations within a GUI rendering area may be selected to correlate to selected locations on the graph under consideration. In some embodiments, SDM 102 correlates first and second reference points in the rendering area to desired starting and end points for a graph under consideration. When the graph under consideration is a two-dimensional plot, for example, SDM 102 may use the lower left hand corner of the GUI rendering area as a first reference point, and correlate the origin (i.e., the intersection of the X and Y axes) of the graph under consideration with the first reference point. In addition, SDM 102 may utilize upper right hand corner of the GUI rendering area as a second reference point, and correlate an intersection of the furthest parallels to the X and Y axes of the graph under consideration to the second reference point. Of course, additional reference points may also be used. For example, SDM 102 may assign a third reference point to a portion of the rendering area of a GUI. The position of the third reference point may be set so that the number of pixels between the first and third reference points correlates to the total pixel length of an x-axis of a two dimensional graph. Likewise, the position of the third reference point may be set such that the distance between the second reference point and the third reference point correlates to the total pixel length of a y axis of a two dimensional plot. In this way, SDM 102 may appropriately scale the rendering area of the GUI, based on the scale of the graph under consideration.

In the non-limiting example shown in FIG. 3, the lower left hand portion of rendering area 301 is identified as first reference (starting) point 305, the upper right hand portion of rendering area 301 (defined by the intersection of lines 306 and 307) is identified as a second reference (ending) point 308, and the lower right hand portion is identified as third reference point 311. First, second, and third reference points 305, 308, 311 correspond to equivalent positions 305', 308', and 311', respectively, of graph 309. As may be appreciated, the distance between the first reference point 305 and third reference point 311 corresponds to the total pixel length of the x axis of graph 309. Likewise, the distance between second reference point 308 and third reference point 311 corresponds to the total pixel length of the y axis of graph 309.

Reference points within rendering area 301 may be set by moving input device 310 to relevant portions of graph 309 and causing SDM 102 to record that position as a reference point. Recording to the position may be instigated by an input made through input device 310, another portion of IM 101, or some other means. Such inputs may include, for example, a mouse click, a button press, a touch on a touch screen, a voice command, combinations thereof, and the like. Thus, for example, input device 310 may be moved to the origin of graph 309 (i.e., point 305'), and an input (e.g., a mouse click) may cause SDM 102 to record that position as reference point 305 in rendering area 301. Input device 310 may be subsequently moved to other desired positions (e.g., points 308', 311') whereupon SDM 102 may record such positions as second reference point 308 and third reference point 311.

In some embodiments, SDM 102 may include instructions that when executed cause digital pointer 304 to be located at a reference point in rendering area 301 when input device 310 is at a corresponding point on printed graph 309, and vice versa. Thus for example, when input device 310 is located at position 305', digital pointer 304 may be located at reference point 305, and vice versa. Likewise, when input device 310 is located at positions 308' or 311', digital pointer 304 may be located point 308' and 311', respectively, and vice versa.

In embodiments wherein an image 303 of graph 309 is present in rendering area 301, the reference points utilized may be associated with corresponding points in image 303. This may be accomplished, for example, by appropriately adjusting the size and/or position of image 303. This concept is illustrated in FIG. 3, wherein image 303 has been sized and positioned in such a way that its origin corresponds to the first reference point 305, and the intersection of the furthest parallel lines to its axes correspond to second reference point 308.

As noted previously, SDM 102 may convert the pixel coordinates of a digital pointer in the rendering area of a GUI to data values of a graph under consideration. SDM 102 may perform this conversion, for example, by determining the difference between the pixel coordinates of the digital pointer and the pixel coordinates of a reference point, and applying the scaling factor determined above. For clarity, reference is again made to FIG. 3, wherein first reference point 305 corresponds to the origin (0,0) of graph 309, and thus may be considered by SDM 102 to have pixel coordinates of (0,0). In response to movement of input device 310, digital pointer may move to a location within rendering area 301 of WBGUI 300, e.g., to a point having pixel coordinates of (100, 100) (or some other point), relative to reference point 305.

SDM 102 may then convert the pixel coordinates (100,100) of digital pointer 304 to actual data values in graph 309 by applying the SF(x) and SF(y) (determined above) in the following formula:

$$DV(x,y)=C(x,y)*1/SF(x)$$

Where C(x, y) is the x or y pixel coordinate of digital pointer 304, 1/SF (x, y) is inverse of the scaling factor for the relevant axis (e.g., $U(x)/\Delta P(x)$, where U is 1 unit of the X axis and $\Delta P(x)$ is the number of pixels corresponding to 1 unit of the X axis), and DV (x, y) is the calculated data value for the relevant axis. Thus for example, if C(x) and C(y) are both 100 pixels, 1/SF(x) is 1 Celsius/1000, and 1/SF(y) is 1 second/100 pixels, SDM 102 may calculate the position of digital pointer 304 as correlating to 1 second and 0.1 degrees on graph 309.

As demonstrated above, the systems and methods of the present disclosure can enable rapid and facile data extraction from a printed graph, such as graph 309 in FIG. 3. Indeed, data extraction may be performed by moving an input device 310 over graph 309, resulting in a corresponding movement of digital pointer 304. SDM may then convert the pixel coordinates of the digital pointer 304 (as discussed above) to calculate actual data points corresponding to the position of input device 310. SDM 102 may cause the calculated data values to appear, for example, within reporting area 302 of rendering area 301.

Although not required, SDM 102 may also include instructions that when executed by a processor cause the processor to produce an image reflecting the path of input device 310 as it moves over graph 309. In such instances, features of graph 309 may be reproduced in rendering area 301. For example, where graph 309 is a line graph, input device 310 may trace or otherwise follow one or more lines plotted in the graph. As input device 310 traverses the plotted line, SDM 102 may cause an image of the path of input device 310 to appear ion rendering area 301. In this way, SDM 102 can cause an image of all or a portion of a printed graph under consideration to appear in rendering area 301. The image produced in this manner may, for example, over or underlay a pre-loaded electronic image of the graph under consideration, such as image 303 discussed above.

As discussed above, the systems of the present disclosure can enable the extraction of data from printed graphs. It should be understood, however, that the systems disclosed herein are not limited to such use. For example, the systems described herein may also be used to analyze electronic graphs. In such instances, the systems described herein may calculate or otherwise determine the aforementioned scaling factors by monitoring the change in pixel coordinates of a digital pointer, as it traces all or a portion of the axes of the electronic graph under consideration. The functions of IM 101 and SDM 102 are otherwise largely the same as those discussed above in conjunction with the analysis of a printed graph. Accordingly, the function of IM 101 and SDM 102 in the analysis of electronic graphs is not reiterated herein.

Likewise, the systems of the present disclosure may be used to analyze physical bodies, such as but not limited to geometric shapes. In such instances, SDM 102 may calculate or otherwise determine a scaling factor in the manner described above, and use such scaling factor to normalize the movement of a digital pointer to the movement of an input device. Once relevant scaling factor(s) is (are) determined, SDM 102 may calculate relevant data values by converting the pixel coordinates of a digital pointer to data values as an input device traces or otherwise follows features of the geometric shape/physical body.

As noted above, the systems of the present disclosure may further include analysis module (AM) 103. Generally, AM 103 may include analysis instructions that when executed by a processor cause the processor to perform one or more analytical operations on data extracted from a chart under consideration. For example, AM 103 may perform calculations to determine the distance between points on a graph, the area under a curve, the volume or area of selected area of a graph or body, etc. In some embodiments, AM 103 may also function to determine mathematical expressions (e.g., an interpolation function) to describe features present on a graph under consideration. For example, if a graph under consideration includes a line (e.g., a curve fit), AM 103 may determine mathematical equation describing the curve fit from data extracted from the chart when an input device traces or otherwise follows the line in question. And in still further embodiments, AM 103 may convert data values to other units or relevant data using known conversion factors or mathematical relationships for the data in question.

Figure 4:
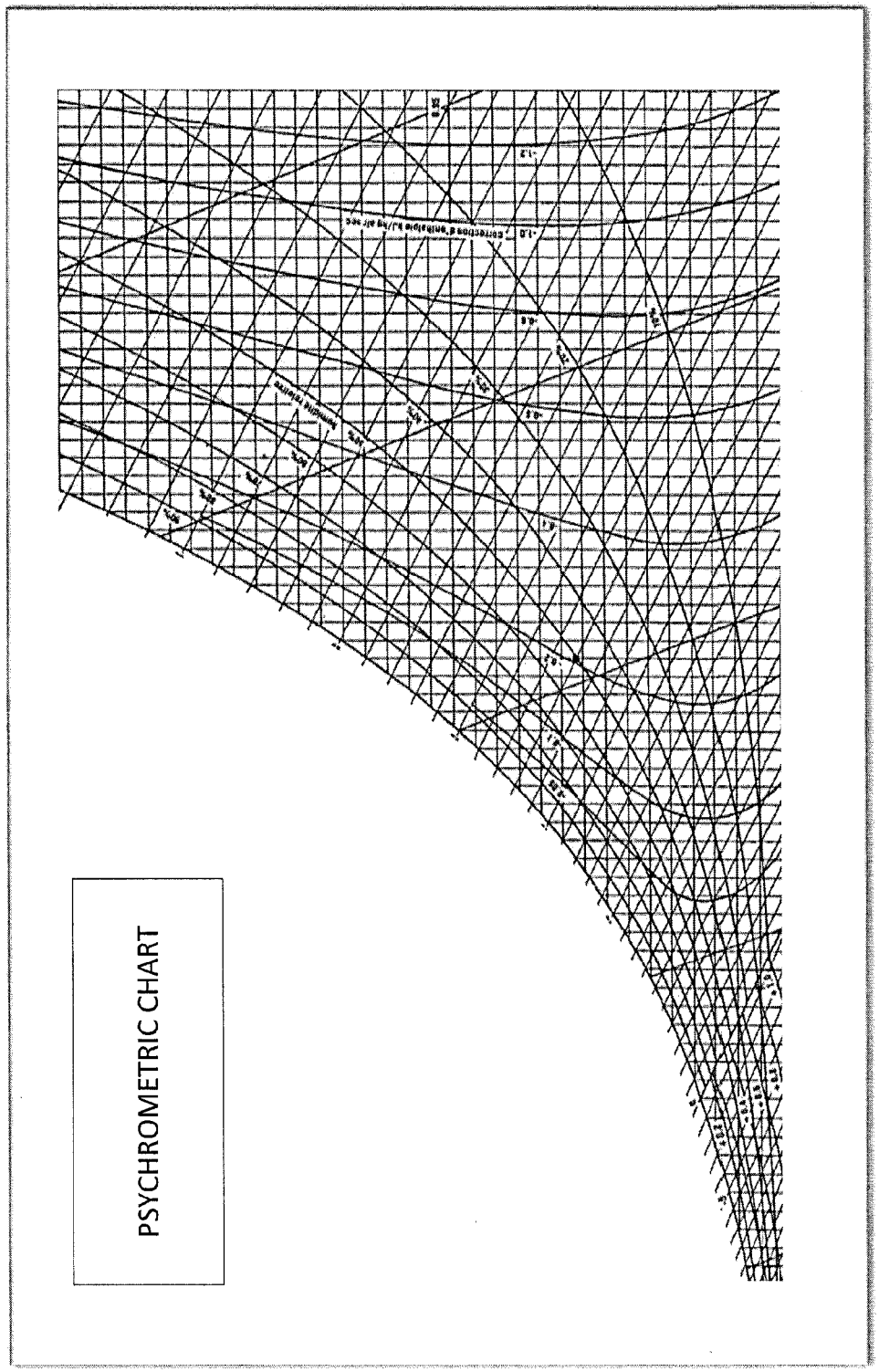
FIG. 4 illustrates a known psychrometric chart.

For the purposes of clarity only, the present disclosure will now describe an example wherein data is extracted from a known psychrometric chart, namely the psychrometric chart depicted in FIG. 4. As is known in the art, a psychrometric chart is a graphical representation of physical and thermal properties of moist air, and may be used to calculate air properties at various temperatures, pressures, and moisture content. The psychrometric chart of FIG. 4 includes two orthogonal axes (Pv, T), where Pv is the partial pressure of vapor in millimeters of mercury (mmHg), and T is air temperature in Celsius. The chart also includes numerous other features, such as the saturation curve for air, a curve for equal humidities, a curve of equal relative humidities, and so forth.

Such additional features are not relevant to this discussion, and so are not discussed in detail herein.

In many instances, scientists and engineers may use a pencil and ruler to find the coordinates of a point on a psychrometric chart. Using this method may be tedious, and does not provide a convenient mechanism for calculating a complex surfaces, extrapolations, interpolations, etc. in the chart. As will be described below, the systems and methods of the present disclosure may enable rapid and facile data extraction and analysis from psychrometric charts.

To extract data from the chart shown in FIG. 4, a digital image of the chart was made, and stored in an appropriate image file format, e.g., a .JPG, .TIFF, .PNG, etc. In this case, the digital image of the psychrometric chart was stored in a .PNG file under the name diagramme.png. An SDM was executed by a processor of a computing device, causing a WBGUI to appear on the display thereof. In this example, the WBGUI was programmed using a combination of HTML and JavaScript. The relevant code is shown below.

```
<HTML>
    <HEAD>
        <TITLE>Electronic Chart </TITLE>
        <!--the title of the webpage-- >
        <SCRIPT LANGUAGE = "JavaScript" src=scripts/electronic
        chart.js">
        <!--the target to the JavaScript script-->
        </SCRIPT>
    </HEAD>
    <BODY background = "images/diagramme.png">
<!-target to a digital copy of the chart -->
    </Body> </HTML>
```

For this example, the above code was created using a basic text editing program, such as the Notepad program available in various MICROSOFT™ WINDOWS™ operating systems. Of course, other programs (e.g., a website development software package) could be used to generate this code. It should also be understood that statements between "<!-" and "-→" are comments that do not affect the operation of the code.

The JavaScript code (here, electronic chart.js) was written to perform various functions of the SDM described above. For example, the JavaScript included code to determine length of the Pv and T axes of the psychrometric chart shown in FIG. 4. The JavaScript also included code to determine appropriate scaling factors, i.e., the length of 1 unit of each axis in pixels (here, the length in pixels corresponding to 1 mm Hg and 1 Celsius, respectively). Finally, and with reference to FIG. 5, the JavaScript included code that set the origin 505 of the image 503 of psychrometric chart 509 to the origin of rendering area 501 of WBGUI 500. The JavaScript further included code to apply the scaling factors for the Pv and T axes of psychrometric chart 509, so as to convert the location (pixel coordinates) of a digital pointer (not shown) in rendering area to pressure and temperature values. The JavaScript caused the results of that conversion to be displayed in reporting area 502, which took the form of a popup window in this example.

For the sake of interactivity, the JavaScript further included code that caused the properties calculated by the system to be synchronously determined and displayed in reporting area 502, as a digital pointer (again, not shown) was moved over image 503 of graph 509. However, it should be understood that synchronous reporting of calculated values is not required. Indeed, the JavaScript applied in this example could have been configured to display the calculated results in reporting window 502 in response to an input, e.g., a mouse click.

Figure 6:
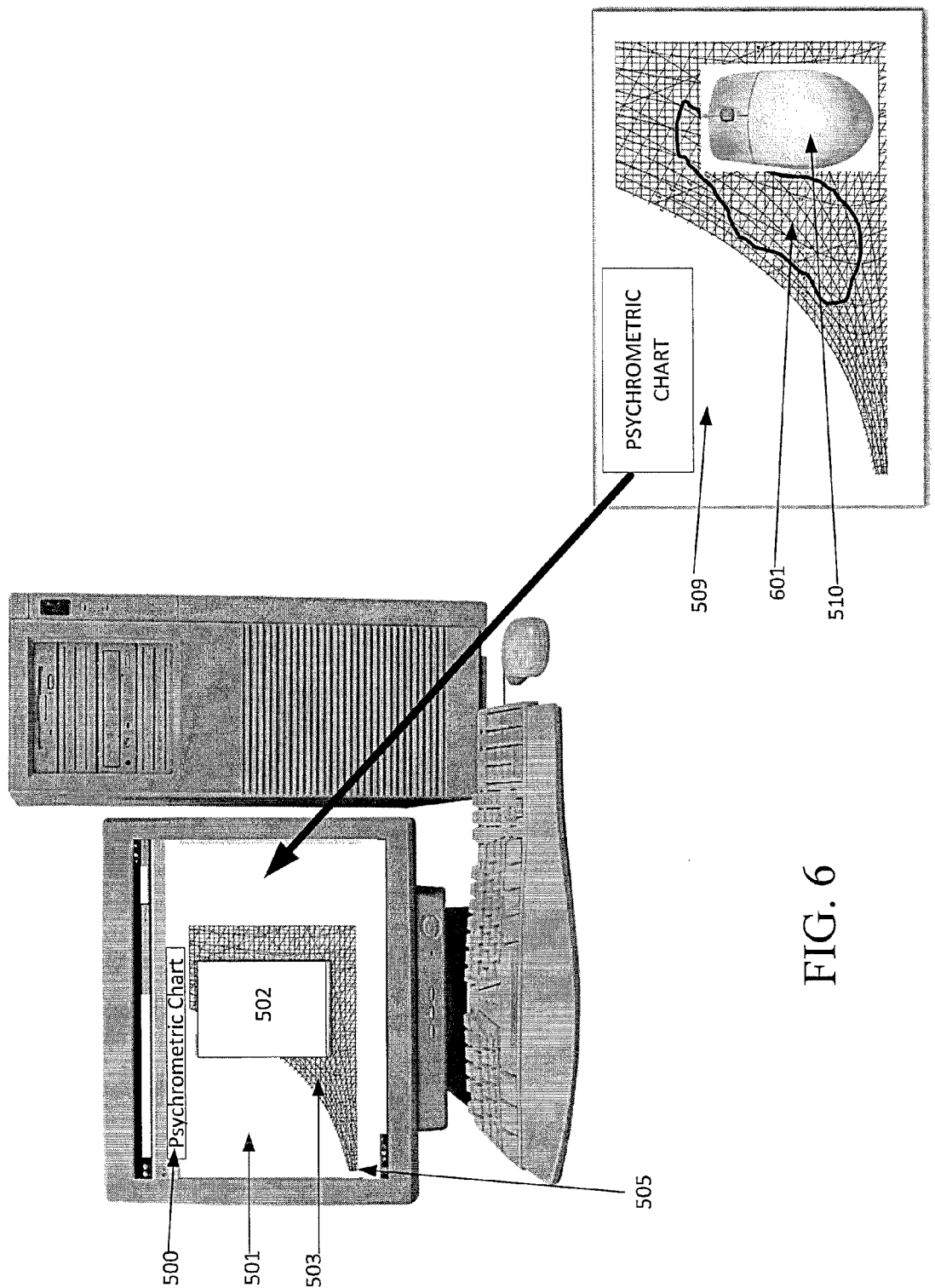
FIG. 6 illustrates an example in which a system in accordance with the present disclosure is used to calculate the area of a selected region of a psychrometric chart.

The system used in this example further included an analysis module to perform one or more calculations on the data extracted in the manner discussed above. As shown in FIG. 6, for example, the analysis module included code that when executed caused a processor to determine the area of a region 601 on graph 509 that was traced by input device 510. The code further causes the calculated area of region 601 to be displayed in reporting area 502.

The analysis module also included code to calculate other properties from the data points extracted from the psychrometric chart. In this case, the analysis module included code to calculate various properties of air from the partial pressure of vapor ($P_v$) and air temperature (T) information extracted from the graph. In this regard, it is known that the eight properties that describe the state of air (include relative humidity (HR), absolute humidity (x), partial pressure of vapor ($P_v$), condensation temperature ($T_r$), equilibrium temperature ($T_h$), air temperature (T), enthalpy (i) and density (ρ)) are related by six known mathematical equations. In this example, the analysis module was configured to solve these six mathematical relationships, thereby calculating HR, x, $T_r$, $T_h$, i, and ρ from one or more of the extracted values of $P_v$ and T.

For example, the analysis module included code to calculate relative humidity (HR) using the following two equations:

$$P_s(t) = \exp[46.784 - (6435/(T+273.15)) - 33868 \ln(T+273.15)]; \quad (1)$$

$$HR = (P_v/P_s(T))*100 \quad (2)$$

where Ps(t) is the pressure of saturation in mm/Hg. By inputting the air temperature (T) extracted from the psychrometric chart, the analysis module can solve equation (1) to determine Ps(t). The analysis module can then input Ps(t) and the partial pressure of vapor ($P_v$) extracted from the psychrometric chart into equation (2) and solve for relative humidity (HR).

The analysis module in this example was configured to provide the results of the above mathematical operation to the JavaScript of the synchronization and display module. The synchronization and display module then caused the calculated results to be displayed in the reporting area of the GUI.

For the sake of illustration, the JavaScript code (i.e., electronic chart.js) for the analysis of the psychrometric chart of FIG. 4 is provided below. It should be understood that this code is exemplary only, and that other code may be used. It should also be understood that this code includes the code for the synchronization and display module (e.g., SDM 102) and the analysis module (e.g., AM 103) that were used to analyze the psychrometric chart of FIG. 4.

```
Electronic chart.js
<!--
    document.onclick = printEvent;
    function printEvent(e)
    {
    m_X = event.screenX;
    m_Y = event.screenY;
```

-continued

```
if ( m_X < 27 || m_X > 955 || m_Y > 681 || m_Y < 153)   <!-- This instruction tests if the point selected is inside the graph or outside --!>
{
alert (" The point selected is outside the graph. Please select a point from inside the graph ")
}
else {
m_X = (m_X – 173)/14.1 ;
m_Y = (680 – m_Y)/15.66 ;
rho = (1.293*273.15*(18/29)*(1+m_Y/1000))/((m_X+273.15)*((18/29)+m_Y/1000));
h = 1.006 * (m_X) + (m_Y/1000) * (2501+1.840*(m_Y));
pv = (1.01325*(m_Y/1000))/((18/29)+(m_Y/1000)) ;
facteur = 20.3182−2795/(m_X+273.15)−1.68*Math.log(m_X+273.15) ;
ps = Math.pow(10,facteur) ;
ps = ps/750.01 ;
hrm = (pv/ps)*100 ;
th = 0 ;
t1 = −50 ;
t2 = 200 ;
tr = 0 ;
for (i = 1 ;i <= 50 ;i++) {
t1=(t1+t2)/2 ;
fact = 20.3182−2795/(t1+273.15)−1.68*Math.log(t1+273.15) ;
p1 = Math.pow(10,fact) ;
p1 = p1/750.01 ;
delta = t2−t1 ;
if (p1 > pv)
{
t2 = t1 ;
}
if (p1 <= pv)
{
t1 = t1 ;
}
if ( delta < 0.5 )
{
tr = (t1+t2)/2 ;
}
}
t1 = tr ;
t2 = m_X ;
for (i = 1 ;i <= 50 ;i++) {
th=(t1+t2)/2 ;
fact = 20.3182−2795/(th+273.15)−1.68*Math.log(th+273.15) ;
pc = Math.pow(10,fact) ;
pc = pc/750.01 ;
lv = 2501.8 − 2.378*th ;
ph = pc−1.006*(1.01325−pc)*(m_X−th)/(0.622*lv) ;
delta = t2−t1 ;
if (ph > pv)
{
t2 = th ;
}
if (ph <= pv)
{
t1 = th ;
}
if ( delta < 0.5 )
{
th = (t1+t2)/2 ;
}
}
m_X = m_X.toFixed(2) + " °C.";
m_Y = m_Y.toFixed(3) + " g/kg AS";
rho = rho.toFixed(3) + " kg/m3";
hr = hrm.toFixed(2) + " %";
h = h.toFixed(3) + " kj/kg";
pv = pv.toFixed(5) + " bar" ;
tr = tr.toFixed(2) + " °C." ;
th = th.toFixed(2) + " °C." ;
ps = ps.toFixed(2) + " bar" ;
if (hrm > 100.01) {
alert(" The point selected is in the fog zone ");
}
else {
alert(" Properties of air :\n \n – Temperature = " + m_X + "\n \n – Absolue Humidity = " + m_Y + "\n \n – Relative Humidity = " + hr + "\n \n – Specific Enthalpy = " + h + "\n \n – Pressure of Vapour = " + pv + "\n \n – Density = " + rho + "\n \n – Wet Temperature = " + th + "\n \n – Temperature of Saturation = " + tr + "\n\n\n");
```

-continued

```
        cordx = event.clientX − 5 ;
        cordy = event.clientY − 5 ;
        document.write('<BODY background="images/diagramme.png"><div id="image1"
style="position:absolute; overflow:hidden; left:' + cordx + 'px; top:' + cordy + 'px; width:5px;
height:5px; border:red 4px solid "><img src="images/logo.png" border=3 width=3
height=3></div>');
        document.write('<br><br><br><br><a href="diagramme psychrometrique.html"> <font
face="monospace" color=blue>Select another point </font></a>');
        document.write('<br><br><a href="CALCUL.html"> <font face="monospace"
color=blue> Back to the graph </font></a>');
        document.write("<br><br><br><br><font face=arial size=2>PROPERTIES : <ul><li>
Temperature      = " + m_X + "<li> Absolute Humidity    = " + m_Y + "<li> Relative Humidity
= " + hr + "<li> Specific Enthalpy = " + h + "<li> Pressure of Vapour = " + pv + "<li> Density
= " + rho + "<li> Wet Temperature = " + th + "<li> Temperature of Saturation = " + tr + "
</font></ul> ");
        }
        }
        }
        document.onmousemove = donnee ;
        document.onmouseup = donnee ;
        function donnee(e) {
        x = event.screenX;
        y = event.screenY;
        if ( x < 27 || x > 955 || y > 681 || y < 153 )
        {
        window.status =         ' Temperature =       Wet Temperature = Humidity =
Pressure of Vapour = ';
        }
        else {
        x = (x − 173)/14.1 ;
        y = (680 − y)/15.66 ;
        rho = (1.293*273.15*(18/29)*(1+y/1000))/((x+273.15)*((18/29)+y/1000));
        h = 1.006 * (x) + (y/1000) * (2501+1.840*(y));
        pv = (1.01325*(y/1000))/((18/29)+(y/1000)) ;
        facteur = 20.3182−2795/(x+273.15)−1.68*Math.log(x+273.15) ;
        ps = Math.pow(10,facteur) ;
        ps = ps/750.01 ;
        hrm = (pv/ps)*100 ;
        th = 0 ;
        t1 = −50 ;
        t2 = 200 ;
        tr = 0 ;
        for (i = 1 ;i <= 50 ;i++) {
        tl=(t1+t2)/2 ;
        fact = 20.3182−2795/(tl+273.15)−1.68*Math.log(tl+273.15) ;
        pl = Math.pow(10,fact) ;
        pl = pl/750.01 ;
        delta = t2−t1 ;
        if (pl > pv)
        {
        t2 = tl ;
        }
        if (pl <= pv)
        {
        t1 = tl ;
        }
        if ( delta < 0.5 )
        {
        tr = (t1+t2)/2 ;
        }
        }
        t1 = tr ;
        t2 = x ;
        for (i = 1 ;i <= 50 ;i++) {
        th=(t1+t2)/2 ;
        fact = 20.3182−2795/(th+273.15)−1.68*Math.log(th+273.15) ;
        pc = Math.pow(10,fact) ;
        pc = pc/750.01 ;
        lv = 2501.8 − 2.378*th ;
        ph = pc−1.006*(1.01325−pc)*(x−th)/(0.622*lv) ;
        delta = t2−t1 ;
        if (ph > pv)
        {
        t2 = th ;
        }
        if (ph <= pv)
        {
        t1 = th ;
        }
```

-continued

```
    if ( delta < 0.5 )
    {
    th = (t1+t2)/2 ;
    }
    }
    x = x.toFixed(2) + " °C.";
    y = y.toFixed(3) + " g/kg AS";
    rho = rho.toFixed(3) + " kg/m3";
    hr = hrm.toFixed(2) + " %";
    h = h.toFixed(3) + " kj/kg";
    pv = pv.toFixed(5) + " bar" ;
    tr = tr.toFixed(2) + " °C." ;
    th = th.toFixed(2) + " °C." ;
    ps = ps.toFixed(2) + " bar" ;
    window.status = ' Temperature = ' + x + '    Wet Temperature = ' + th + '  Humidity = '
+ hr + ' Pressure of Vapour = ' + pv ;
    }
    }
// -->
```

Figure 7:
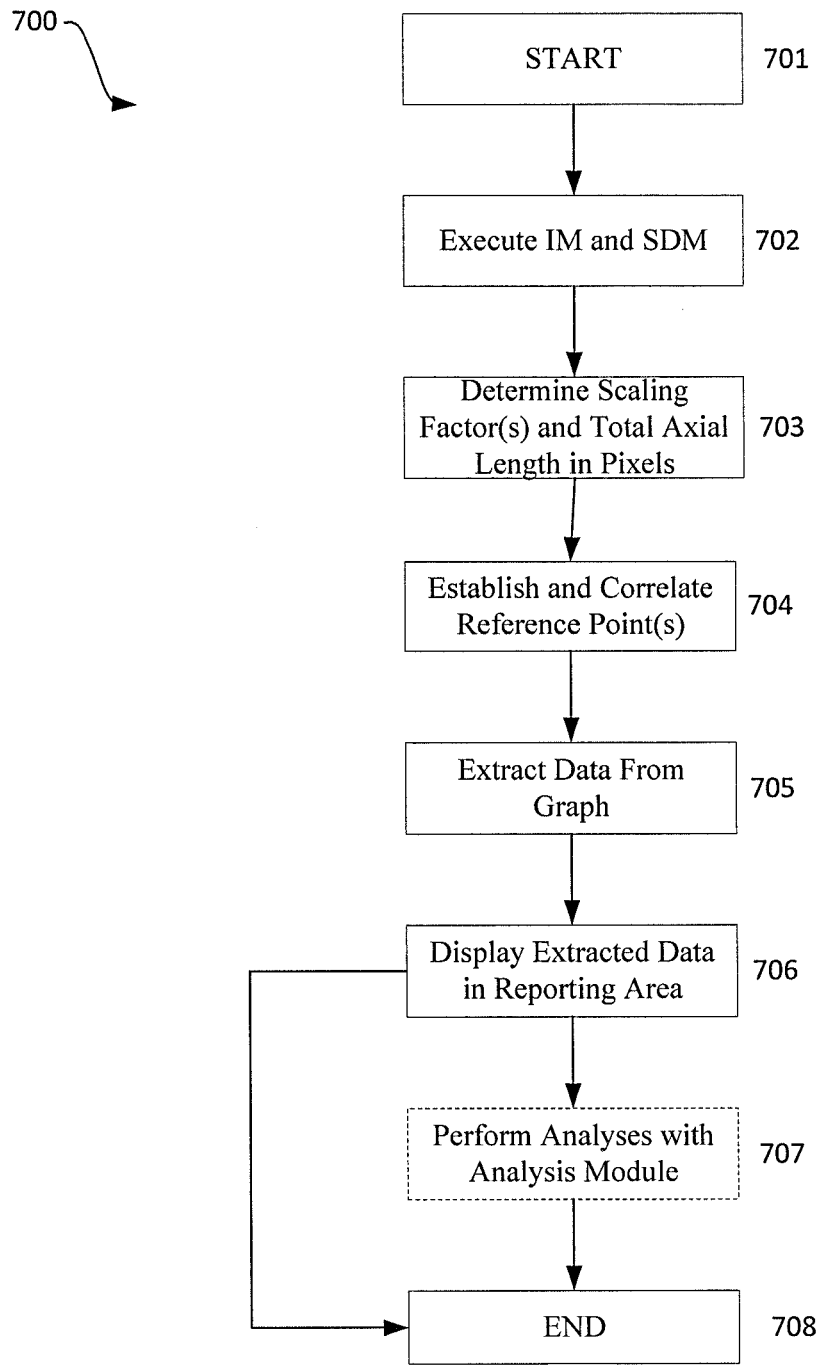
FIG. 7 is a block diagram of an exemplary method in accordance with the present disclosure.

Another aspect of the present disclosure relates to a method for analyzing a graphs and/or physical bodies. In this regard, reference is made to FIG. 7, which depicts a flowchart of an exemplary method in accordance with the present disclosure. As shown, method 700 begins at block 701. At block 702, an input module (IM) and synchronization and display module (SDM) may be executed by a processor. The IM and SDM function as described previously in conjunction with the system, and thus their functions are not reiterated herein. At block 703, the SDM may determine a scaling factor (in pixels) for a unit of each axis of a graph under consideration, as well as the total length (in pixels) for each graph.

At block 704, the SDM may establish one or more reference points in the rendering area of a GUI displayed on a computing device, and correlate such reference point(s) to appropriate portions of the graph under consideration. As noted previously, the SDM may correlate the origin of a graph under consideration with a specific region of a rendering area of a GUI.

At block 705, the IM and SDM may be used to extract data from the graph under consideration by applying the scaling factor(s) determined in block 703 to convert the pixel coordinates of a digital pointer to data points of the graph under consideration. At block 706, the SDM may cause the calculated data points to appear in a reporting area. In instances wherein the input module is coupled to or is part of a mobile computing device such as a smart phone, the SDM (and/or the optional analysis module) may utilize data from one or more sensors within the module computing device to enhance the accuracy of measurements taken by the input device, and/or to add functionality to the measurement system. For example, GPS sensor data, accelerometer data, gyroscope data, etc. may be used to enhance the accuracy of length, velocity, acceleration, etc. measurements taken by an input device. The method may then proceed to optional block 707, wherein an optional analysis module may be used to perform one of more analyses on the data extracted from the graph by the SDM. If performed, results of these analyses may also be displayed in the reporting area.

At block 708, the method ends.

Another aspect of the present disclosure relates to systems and methods for extracting data from multiple charts simultaneously. In this regard, it is noted that many graphs encountered in engineering have two independent axes, representing two variables. As a result, it can be difficult to extract data from graphs having more than two axes. This can be problematic in industries where the optimization of multiple variables is desired. As discussed below, the systems and methods of the present disclosure can address this issue by allowing multiple graphs to be analyzed at the same time.

In this aspect, a printed or electronic copy of a first graph is processed in the same manner as described above for the analysis of a single graph. That is, an input module (IM) and synchronization and display module (SDM) are leveraged to determine the length of each axis of the first graph, as well as appropriate scaling factors for each graph. The SDM applies the scaling factors to scale the movement of a digital pointer in a GUI to the movement of an input device. The SDM further establishes one or more reference points in the GUI, which correspond to identify locations in the first graph. The system may then extract data from the first graph by converting the pixel coordinates of the digital pointer in the GUI to data points using the scaling factor, as described above. As noted previously, an electronic copy (e.g., image) of the first printed chart can be displayed in the GUI. For example, an electronic copy of the first graph may be embedded in a GUI, such as the GUI's described above.

The first graph may then be replaced by a printed or electronic copy of a second graph. The second graph may have at least one axis in common with the first graph. That is, the second graph may have an axis in the same units as an axis of the first graph. Alternatively or additionally, the second graph may have at least one axis that is in units that bear a mathematical relationship to the units of at least one axis of the first graph. For convenience, the axes of the first and second graphs that are in the same or mathematically related units are individually and collectively referred to herein as a "common axis" or "common axes."

Although not required, the common axes of the first and second graphs may be of the same physical length. This may be accomplished, for example, by adjusting the scale of the first or second graph such that their common axes are of the same physical length. Alternatively or additionally, a length adjustment factor may be determined by calculating a ratio of the length of the axes of the first graph to the length of the corresponding axes of the second graph or vice versa. This length adjustment factor may be applied by an SDM to compensate for differences in the physical length of the common axes of the first and second graphs. In any case, like the first graph, an electronic copy of the second graph may be displayed in a second GUI. The second GUI may, for example, be positioned adjacent to the GUI displaying the first graph.

Data may then be extracted from the first and second graphs simultaneously by moving the input device (e.g., a mouse, a smart phone (e.g., smart phone sensor), an optical sensor, etc.) over the second graph. As the input device is moved, a corresponding digital pointer may move in the GUI displaying the electronic copy of the first graph. In instances wherein the input device is coupled to or forms part of a mobile computing device such as a smart phone, the electronic copy of the first graph may be displayed on the display of the mobile computing device. The SDM may convert the pixel coordinates of the digital pointer to data in the first graph by applying the scaling factor, as previously described. In instances where the second graph is a printed graph, data from the second graph may be gleaned by inspecting the physical location of the input device on the printed second graph. Alternatively or additionally, data in the second graph may be calculated from the data extracted from the first graph, e.g., using known mathematical relationships between the data in the first and second graphs. Similarly, data may be extracted from the second graph in the same manner as data is extracted from a single graph, as discussed above. In such a case, when an input device is moved over the second graph, the system may extract data from the second graph using the physical position of the mouse, while simultaneously extracting data from the first graph using the position of the digital pointer.

In instances where the first and second graphs are both in electronic form, each graph may be displayed in its own rendering area, and the position of a digital pointer on the second graph may be correlated to the position of a digital pointed on the first graph. Data may then be extracted from the first and second graphs based on the position of their respective digital pointers.

Figure 8:
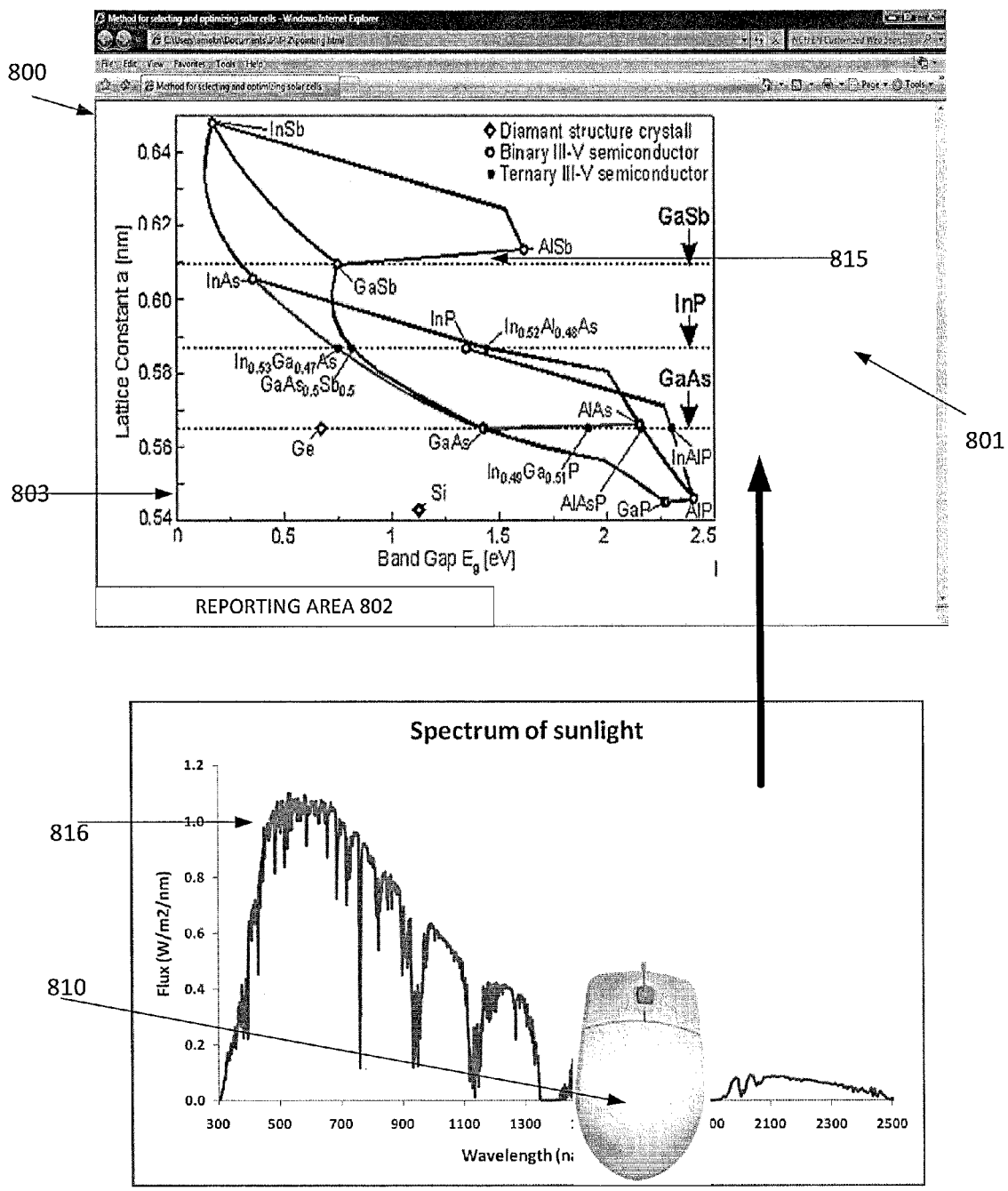
FIG. 8 depicts an example in which a system in accordance with the present disclosure is used to extract data from two different charts.

To illustrate this process, the specification will now describe a non-limiting example wherein a system in accordance with the present disclosure is used to simultaneously analyze two graphs that are useful in the development and optimization of solar cells. More particularly, the first graph in this example plots energy bandgap versus the lattice constant of a solar cell material, and the second graph plots intensity versus wavelength. These graphs are shown in FIG. 8 as first graph 815 and second graph 816, respectively. Engineers in this field might use the first graph to determine the energy bandgap and lattice constant of a cell material. Once those two parameters are determined, the second graph may be used to determine which spectral photons and how much incident solar energy can be converted to electricity by the solar cell under consideration.

In this regard, reference is made to FIG. 8, which depicts an exemplary system for analyzing multiple graphs at the same time. In this example, an SDM (not shown) is executed by a processor, causing graphical user interface (GUI) 800 to be displayed on a display of a computing device (not shown). In this case, printed copy of first graph 815 was converted into an image 803, which was displayed within rendering area 801 of GUI 800. Consistent with the foregoing discussion regarding data extraction from a single graph, image 803 was aligned with one or more reference points. Input device 810 was used to trace the x and y axes of the printed copy of first graph 815. As the input device 810 moved, SDM monitored the corresponding movement of a digital pointer in rendering area 801. The SDM then determined appropriate the total length of and appropriate scaling factors for each axis of first graph 815. Data was then extracted from first graph 815 using the methods described above for the analysis of a single chart.

The printed copy of first graph 815 was then replaced with a printed copy of second graph 816. As described above and shown in FIG. 8, second graph 816 plots flux versus wavelength (nm). The wavelength of second graph 816 was mathematically related to the energy bandgap in first graph 815 by the function:

$$1240/EB=W(nm)$$

Where EB is the energy bandgap of first graph 815, W is the wavelength of second graph 816, and 1240 is a constant. Although not apparent from FIG. 8, it is noted that the physical length of the x axis of second graph 816 was the same as the physical length of the x axis of first graph 815.

Input device 810 was then moved over the printed copy of second graph 816. This movement caused a corresponding movement of a digital pointer (again, not shown) over the image 803 of first graph 815. As input device 810 moved in this manner, the SDM applied the scaling factors (determined for first graph 815 as discussed above) to convert the pixel coordinates of the digital pointer on graph 1 to data in graph 1. In this case, the data extracted from first graph 815 was displayed in reporting area 802, e.g., in a status bar of GUI 800. The SDM also correlated the extracted data values with the corresponding cell material (shown in first graph 815), and displayed that material in reporting area 802.

The SDM in this example was also configured to synchronously or asynchronously utilize the data extracted from first graph 815 to calculate corresponding data in second graph 816. In this case, the SDM was configured to calculate the wavelength of second graph 816 using the energy bandgap data extracted from first graph 815, e.g., by rearranging the foregoing mathematical function describing the relationship between energy bandgap and wavelength. The fourth variable, flux (shown in second graph 816), could also be calculated using Planck's law. The SDM caused the calculated data to appear in reporting area 802.

In this way, the systems of the present disclosure can enable the determination of 3, 4, or more variables, simply by moving input device 810. Simultaneous optimization of such variables may be performed in the same manner, i.e., by moving input device 810 and monitoring the data reported in reporting area 802.

Figure 9:
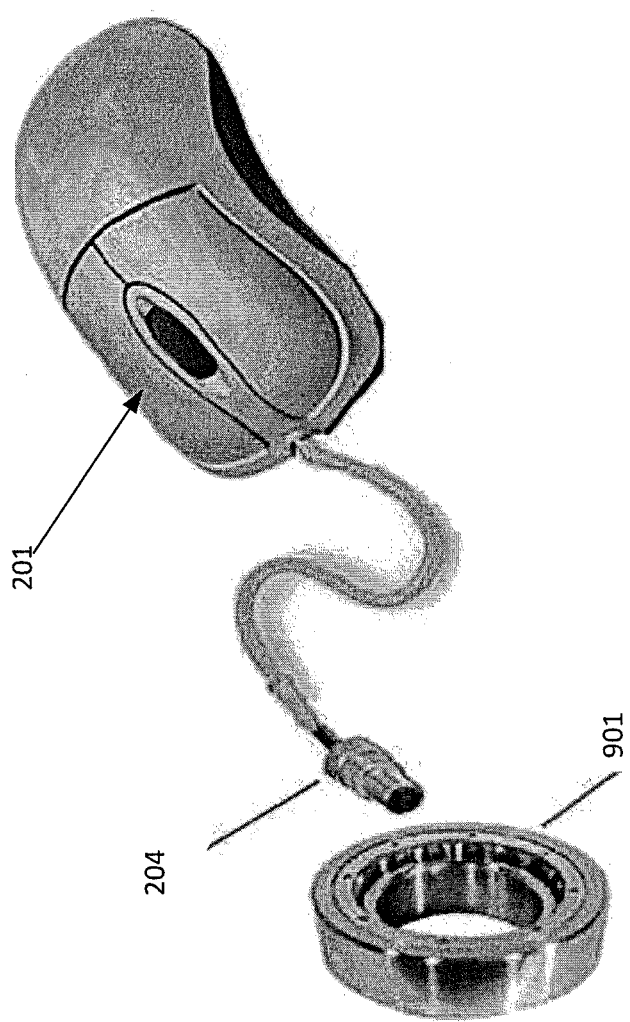
FIG. 9 depicts an example in which a system in accordance with the present disclosure is used to take measurements from a physical body.

FIG. 9 depicts an example in which an input device is used to measure one or more features of a physical body. In this example, mouse 201 having optical sensor 204 coupled thereto is used as the input device. As in the analysis of a graph, one or more reference points may be established on object 901, and such reference points may be correlated with points in GUI for the analysis of a physical body. The distance in pixels may then be determined by moving optical sensor 904 between the reference points on object 901. The system may then determine a scaling factor to scale the movement of optical sensor 901 to the movement of a digital pointer within the GUI. The system may then calculate various properties of physical object 901 by monitoring the movement of the digital pointer and applying the relevant scaling factor.

In this way, the systems of the present disclosure can enable measurement of complex lines, e.g., curves, s-curves, sawtooths, and the like. Such measurements may be significantly more accurate than hand measurements, as the underlying calculations are based on pixels, instead of larger units such as millimeters. The systems may also enable the measurement of the surface of complex shapes, including those with non-flat surfaces. Moreover, the data from the system may be analyzed to extrapolate even more information from the physical body, such as curvature, distance, flatness, etc. Without limitation, such systems may have significant practical utility in mechanical or carpenters shops, where measurements are of particular importance.

Although not expressly illustrated, the system of FIG. 9 may be utilized to analyze multiple physical bodies (and/or representations of a physical body) in much the same manner as multiple graphs are analyzed in accordance with the foregoing description of FIG. 8 That is, the input devices described herein (or more particularly, the sensors included in such input devices) may be used to take physical measurements of a physical object, and to compare and/or correlate such measurements to an electronic representation of that or a different physical object. Thus for example, the systems of the present disclosure may compare the properties and measurements (e.g., distance, curvature, etc.) taken from a physical body to those of an electronic representation of that or a different physical body (e.g., a standard).

It is noted that for the sake of illustration, FIG. 9 depicts an example wherein an optical sensor is attached to a computer mouse. It should be understood that such illustration is exemplary only, and that any suitable input device with any suitable sensor may be used. For example, a smart phone with an integral optical sensor may be configured with an AM, SDM, etc., and thus be able to analyze graphs and physical bodies in much the same manner as previously described. Moreover, because smart phones and other mobile computing devices include many different sensors (e.g., optical sensors, GPS. accelerometer, etc.), data from any or all of such sensors may be used to take measurement of a physical body, and/or to enhance the quality/accuracy of such measurements.

While the foregoing description focuses on the movement of an input device (or a sensor thereof) over a physical body and/or graph, such movement is not required. Indeed, in some embodiments the devices and systems of the present disclosure may be held stationary, while a graph or physical body is moved relative to the input device (or a sensor thereof). In such instance, the relative movement of the graph/body can be detected by the sensor(s) of the input device, and synchronized/analyzed by an SDM and optional AM as discussed above.

By way of example, an object to be analyzed may be coupled to a moveable platform (e.g. a wheel), the dimensions of which may be known to an input module coupled to or within an input device. As the platform is moved, the sensor(s) of the input device may detect the movement and correlate the movement to a number of pixels using the known dimensions of the platform. Various measurements of the physical body (angular acceleration, angular speed, length, etc.) of the physical body may then be determined from the detected movement data in much the same manner as previously described.

Another aspect of the present disclosure relates to attachments for mobile computing devices such as cellular phones, smart phones, tablet personal computers, personal data assistants, combinations thereof, and the like. As will be described in detail below, the attachments of the present disclosure may include an input module and other components that may serve as an input device for a mobile computing device. In particular, one aspect of the present disclosure relates to covers and other attachments for mobile computing devices that may enable such devices to extract data and perform operations on one or more graphs in much the same manner as previously described above with respect to other input devices. Alternatively or additionally, the attachments described herein may in conjunction with a mobile computing device form a combined input device for another computing device, such as a desktop computer.

Figure 10A:
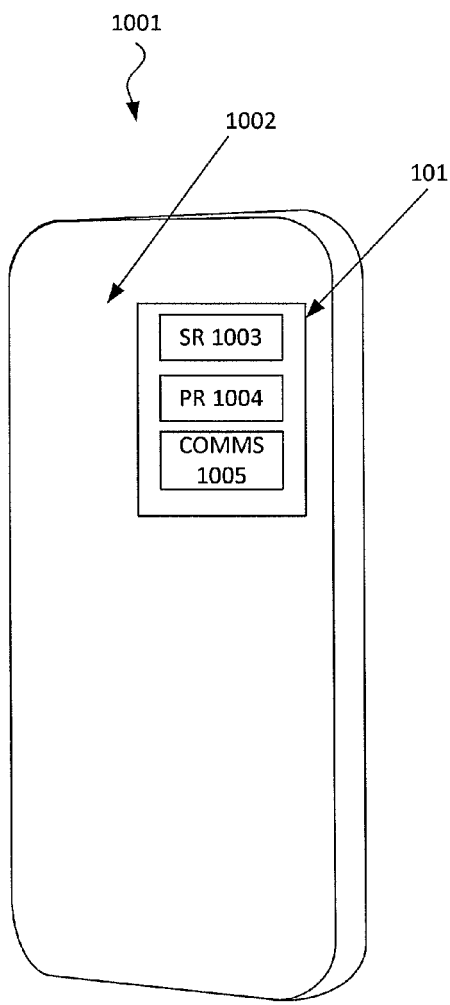
FIGS. 10A and 10B illustrate exemplary input devices consistent with the present disclosure.
Figure 10B:
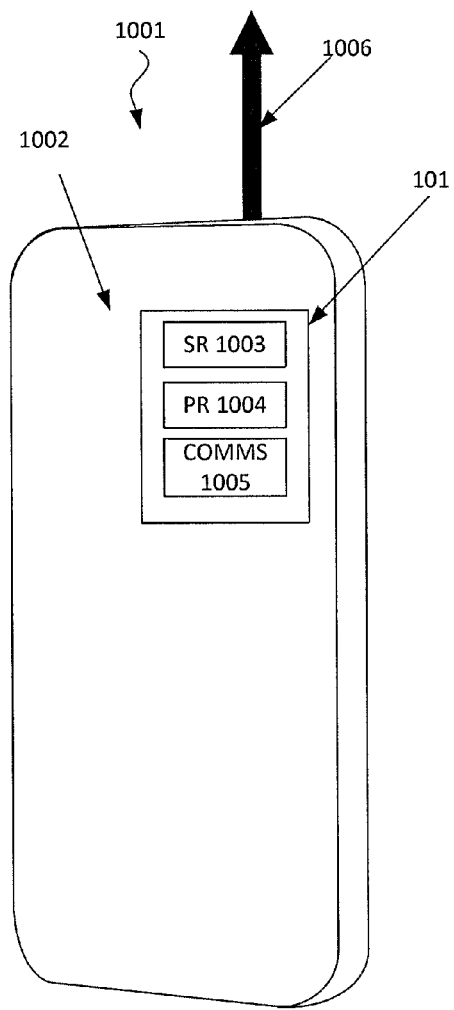

Reference is now made to FIG. 10A, which depicts an attachment 1001 for a mobile computing device consistent with the present disclosure. In this embodiment attachment 1001 is configured in the form of a case or cover for a mobile computing device, such as a smart phone, cellular phone, tablet personal computer, personal data assistant, or the like. Thus in the embodiment of FIG. 10A, attachment 1001 may include a body 1002 to that is configured to mate with and/or mechanically engage at least a portion of the external surface of a mobile computing device.

For example, body 1002 may include one or more ridges, mechanical fittings (e.g., snap and/or press fittings), locking portions, mating elements (e.g. male/female prongs/receptacles), combinations thereof, and the like, which may mate with or otherwise mechanically engage corresponding portions of a mobile computing device, so as to form a substantially integral (though potentially separable) unit. For example, body 1002 of attachment 1001 may be configured in the form of a clam shell or other case for factor that is configured to engage an exterior portion of a mobile computing device so as to be snap fit thereto. Of course, the form factor of attachment 1001 in the FIGS. is exemplary, and attachment 1001 may be in any suitable form factor. For example, attachment 1001 may be in the form of a case that simply surrounds all or a portion of mobile computing device, without being engaged or coupled thereto. Likewise, attachment 1001 may couple with a mobile computing device in any suitable manner.

Figure 11A:
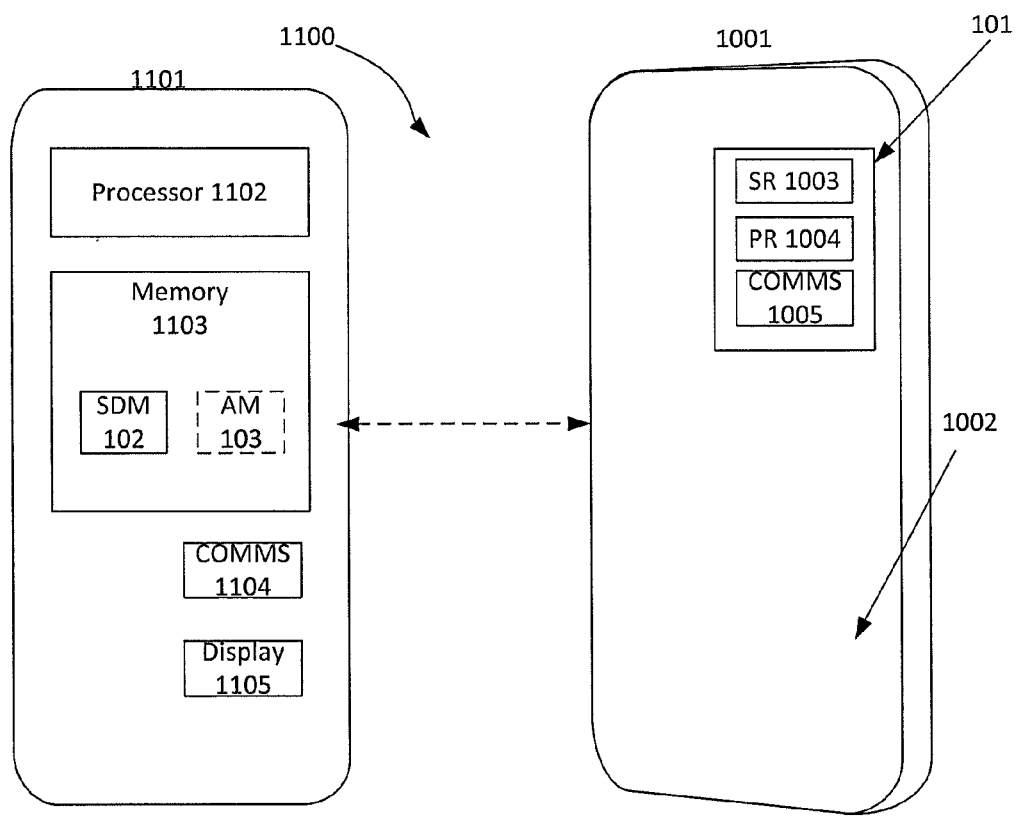
FIGS. 11A and 11B illustrate an exemplary system consistent with the present disclosure.
Figure 11B:
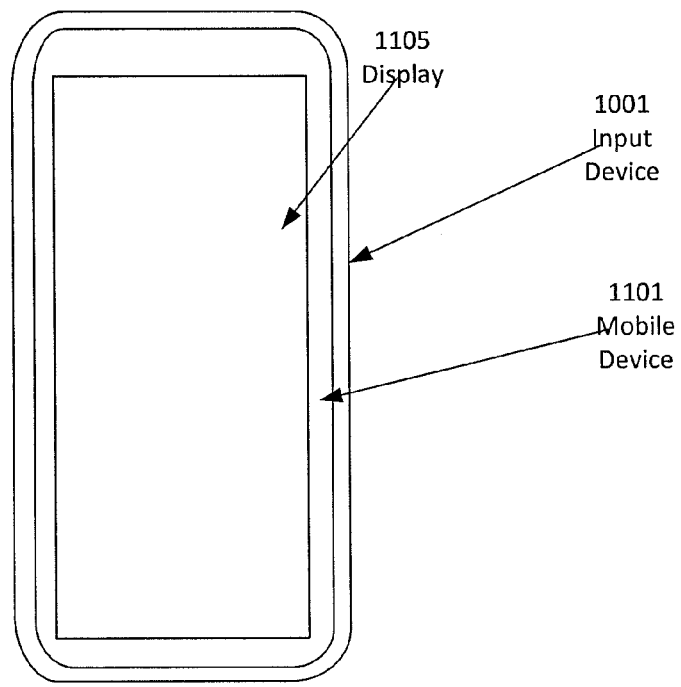
Figure 12:
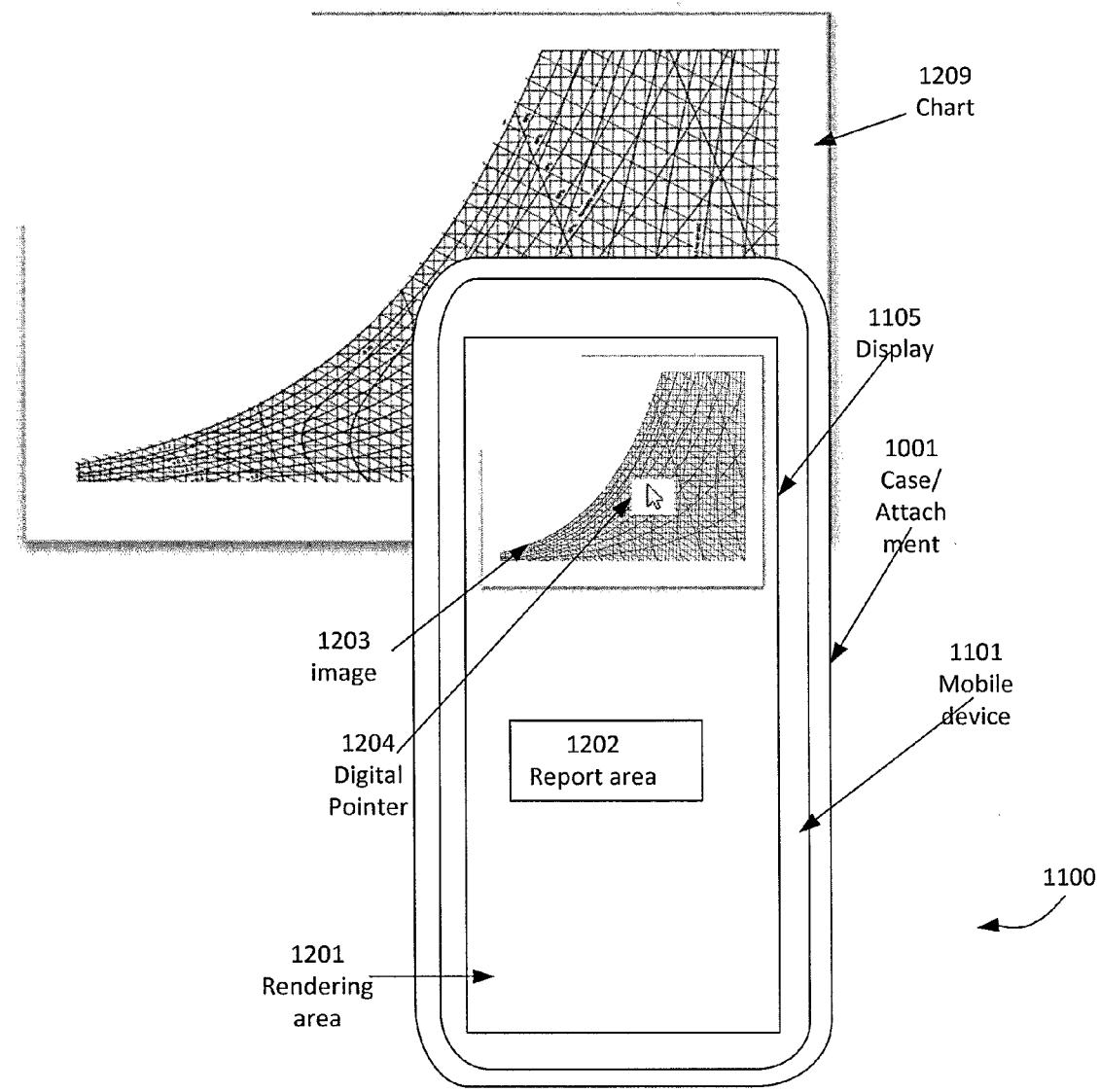
FIG. 12 depicts an example in which a system in accordance with the present disclosure is used to extract data from a psychrometric chart.

The concept of mechanically engaging attachment 1001 to a mobile computing device is shown in FIGS. 11A and 11B, which depict attachment 1001 as separate from (FIG. 11A) and mechanically engaged to (FIG. 11B) mobile computing device 1101. For the sake of illustration, mobile computing device 1101 is shown in the form of a smart phone. It should be understood however that any suitable type of device may be used as mobile computing device 1101, and that the form factor of attachment 1001 may correspondingly change.

Returning to FIG. 10A, attachment 1001 may include an input module (IM) 101. In general, input module 101 may function in much the same manner as the input modules described above in connection with FIGS. 1-9. Thus for the sake of brevity a detailed description of the functions of IM 101 with respect to FIGS. 10A-14 will not be reiterated at length.

IM 101 and its components may be present at any suitable location on and/or within body 1002. For example, all or a portion of IM 101 and its components may be fully or partially embedded within body 1002. Alternatively or additionally, IM 101 and its components may be disposed on a surface of body 1002. In such instances, when attachment 1001 mates with or mechanically engages a mobile computing device, it may be understood body 1002 may have an inner surface disposed proximate to the mobile computing device and an outer surface distal to the mobile computing device. In such instances, all or a portion of the components of IM 101 may be disposed on the inner surface of body 1002, the outer surface of body 1002, or a combination thereof.

As further shown in FIG. 10A, IM 101 of attachment 1001 may include sensor resources (SR) 1003, processing resources (PR) 1004, and communication resources (COMMS) 1005. In general, these resources may operate individually or in combination to enable IM 101 to perform input module functions consistent with the present disclosure, as discussed above. More specifically, the components of IM 101 may enable attachment 1001 to provide information regarding its physical position and/or movement to a synchronization and display module (SDM) of mobile computing device 1101. For example, IM 101 and its components may cause attachment 1001 to send one or more signals indicative of the position and/or movement of the sensor(s) in SR 1003 to an SDM of mobile computing device 1101, e.g., in a similar manner as described previously in connection with FIGS. 1-9.

Non-limiting examples of sensor resources that may be included in SR 1003 include rotary position sensors (e.g., a mouse ball sensor), optical (e.g., lasers, cameras, etc.) sensors, infrared sensors, touch sensors (e.g., a touch pad, touch screen, etc.), trackball sensors, pressure sensors, combinations thereof, and the like. Without limitation, SR 1003 preferably includes at least one optical sensor, touch sensor, rotary position sensor, combinations thereof and the like.

In general, SR 1003 may be configured to detect the location and/or relative movement of attachment 1001, either alone or in cooperation with other components of IM 101. In this regard, IM 101 of FIG. 10A may further include computer readable input module instructions (IMI, not shown) which when executed by a processor (e.g., of PR 1004) may cause attachment 1001 to detect its location and/or relative movement to a synchronization and display module (SDM), which may executed by a mobile computing device. Accordingly, execution of the IMI by processing resources 1004 may cause sensor resources 1003 to detect the position and/or relative movement of attachment 1001, and provide data representative of that location/movement to communications resources (COMMS) 1005.

COMMS 1005 may include hardware (i.e., circuitry), software, or a combination of hardware and software that is configured to allow attachment 1001 to transmit and receive communications to/from a computing device, such as a mobile computing device using wired or wireless communication. In this regard, COMMS 1005 may be configured to send and/or receive signals to/from a mobile computing device using wired communications interface (e.g., a USB interface, a PS/2 interface, etc.), a wireless communications interface (e.g., WiFi, BLUEOOTH™, Near Field Communication (NFC), a personal area network, radio frequency (RF) communication, etc.), combinations thereof, and the like. Alternatively or additionally, COMMS 1005 may transmit data signals to another computing system with which it or mobile computing device 1101 may be paired. In any case, COMMS 1005 may be configured to pair with mobile computing device 1101 and or another computing device using a pre-established pairing protocol prior to sending such signals.

Without limitation, COMMS 1005 is preferably configured to communicate using an interface that is compatible with communications resources of a mobile computing device. Thus for example, where a mobile computing device is includes communications resources that are capable of wireless communication (e.g., via WiFi, NFC, RF, etc.), COMMS 1005 is preferably configured to support a corresponding mode of wireless communication (i.e., WiFi, NFC, RF, etc.).

In the same manner described above in connection IM 101 of FIGS. 1-9, IMI 101 (or, more particularly, COMMS 1005) of FIGS. 10A-11B may communicate information about attachment 1001's (or more specifically, sensor resource 1003's) position and/or movement in a number of different ways. For example, COMMS 1005 may transmit signals that include one or more indicators of the position of attachment 1001 (e.g., SR 1003) to an SDM of a mobile computing device. Such indicators may include for example physical coordinates corresponding to the position of attachment 1001 (e.g., SR 1003) at a set time. Such coordinates may be, for example, X and Y coordinates of a two dimensional Cartesian coordinate system.

Alternatively or additionally, COMMS 1005 may transmit signals that are indicative of the movement of attachment 1001 (e.g., SR 1003) in two dimensions, but which may not correspond to a specific physical location. For example, COMMS 1005 may transmit signals indicating movement and/or speed of the attachment 1001 (e.g., SR 1003) in a particular direction. As discussed above, such information may be applied by a synchronization and display module (e.g., on a mobile computing device) to cause a digital pointer on a display of mobile computing device 1101 to move in a manner that corresponds to the movement of attachment 1001 (e.g., SR 1003).

Reference is now made to FIGS. 11A and 11B, which depict another exemplary system for analyzing graphs in accordance with the present disclosure. As shown, system 1100 includes mobile computing device 1101 and attachment 1001. The nature and function of the components of attachment 1001 were described above in connection with FIGS. 10A and 10B, and thus will not be reiterated.

Figure 14:
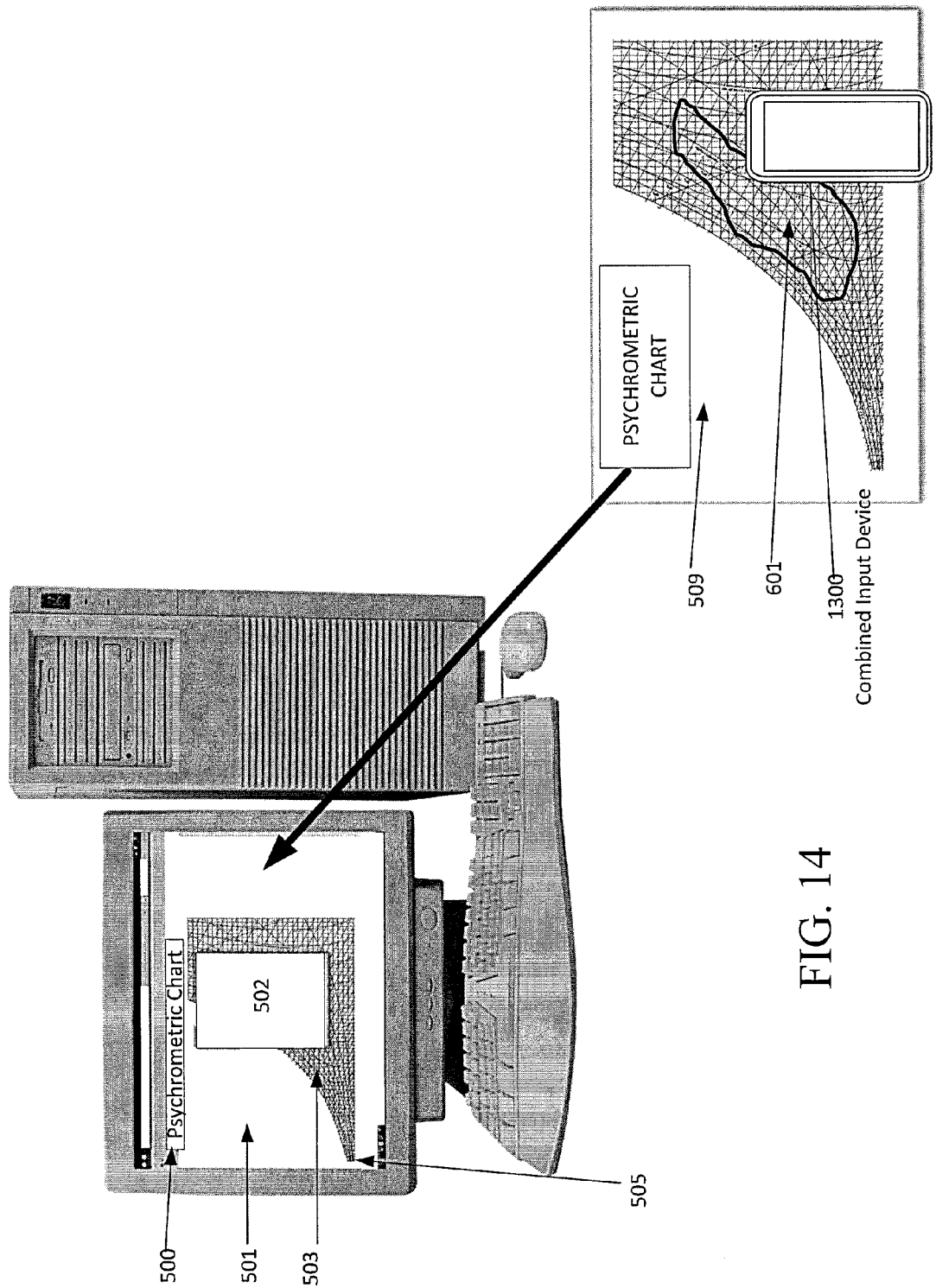
FIG. 14. Illustrates an example in which a combined input device consistent with the present disclosure is used to calculate the area of a selected region of a psychrometric chart.

As illustrated, mobile computing device 1101 may include processor 1102, memory 1103, communications resources (COMMS) 1104, and display 1105. A synchronization and display module (SDM) 102 may be stored on memory 1103. In addition, memory 1103 may also store an optional analysis module (AM) 103. The functions of SDM 102 and AM 103 are substantially the same as described above in connection with SDM 102 and AM 103 of FIGS. 1-9. Accordingly, the nature and function of such components is not reiterated for the sake of brevity. In instances where mobile computing device 1101 and/or attachment 1001 are in wired or wireless communication with another computing device (e.g., as generally shown in FIG. 14), such computing device may also include an SDM and an optional AM, which may function in the same manner as previously described.

Processor 1102 may be any suitable general purpose processor or application specific integrated circuit, and may be capable of executing one or multiple threads on one or multiple processor cores. Without limitation, processor 1102 is preferably a general purpose processor, such as but not limited to the general purpose processors commercially available from INTEL™ Corp., ADVANCED MICRO DEVICES™, ARM™, NVIDIA™, APPLE™, and SAMSUNG™. While FIG. 11 illustrates mobile computing device 1101 as including a single processor 1102, it should be understood that multiple processors may be used.

Memory 1103 may include any suitable type of computer readable memory. Non-limiting examples of such memory includes one or more of the following types of memory: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Additionally or alternatively, memory 1103 may include other and/or later-developed types of computer-readable memory.

Communications resources (COMMS) 1104 may include hardware (i.e., circuitry), software, or a combination of hardware and software that is configured to allow mobile computing device 1101 to transmit and receive communications to/from attachment 1001 (or more specifically, to and from COMMS 1005). Alternatively or additionally, COMMS 1004 may transmit data signals to another computing system with which it may be paired. Without limitation, COMMS 1104 is preferably compatible with COMMS 1005 of attachment 1001 and/or another computing device. Accordingly, like COMMS 1005, COMMS 1104 may be configured to send and/or receive data signals to/from an attachment (e.g., attachment 1001) or another computing system over a wired communications interface (e.g., a USB interface, a PS/2 interface, etc.), a wireless communications interface (e.g., WiFi, BLUEOOTH™, Near Field Communication (NFC), a personal area network, radio frequency (RF) communication, etc.), combinations thereof, and the like. Without limitation, COMMS 1005 and COMMS 1104 are preferably configured to wirelessly communicate using one or more pre-determined wireless communications protocols, such any of the wireless 802.11 protocols, a near field communication protocol, a BLUETOOTH™ protocol, a personal area network protocol, combinations thereof, and the like.

Mobile computing device 1101 may further include display 1105. Display 1105 may be any type of display that is suitable for the form factor of mobile computing device 1101. For example, where mobile computing device 1101 is a smart phone, display 1105 may be in the form of a smart phone display. Likewise, where mobile computing device 1101 is a tablet personal computer, a laptop computer, or a personal data assistant, display 1105 may be in the form of a tablet personal computer display, a laptop display, or a personal data assistant display, respectively. In any case, display 1105 may be configured to perform the same functions as the display of a computing device described above in connection with FIGS. 3, 5, 6 and 8. That is, display 1105 may be configured to render an image of a graph under consideration, e.g., in a graphical user interface that may optionally further include a reporting area for reporting raw data values extracted from the graph.

As shown in FIG. 11B, body 1002 of attachment 1001 may be configured to mate or mechanically engage with mobile computing device 1101 so as to form a substantially integral unit. For example, body 1002 may include features (as described above) that allow it to couple with at least a portion of mobile computing device 1101. Alternatively or additionally, mobile computing device 1101 may features (not shown) that may couple with an interior surface of attachment 1001 and/or with corresponding features of attachment 1001.

Regardless of whether attachment 1001 and mobile computing device 1101 are mechanically engaged as shown in FIG. 11B, input module 101 may be configured to detect the position and/or relative motion of attachment 1001, and provide data representative of that information to SDM 102 of mobile computing device 1101. Accordingly, IM 101 may in some embodiments include machine executable input module instructions (IMI, not shown) which when executed by a processor (e.g., of processing resources 1004) cause the processor to determine the location and/or relative motion of attachment 1001. Consistent with the foregoing description of FIGS. 1-9, execution of the IMI may cause the processor to monitor for signals from sensor resources 1003 that include data representative of the location and/or motion of attachment 1001.

Upon detection of such signals, execution of the IMI may cause a processor of processing resources 1004 to convey that data to communications resources (COMMS) 1005 for transmission to mobile computing device 1101. For example, execution of the IMI may cause COMMS 1005 to transmit data received from SR 1003 to mobile computing device 1001 using wired or wireless communication. Without limitation, communication of data received from SR 1003 may be wirelessly transmitted from COMMS 1005 to COMMS 1104 using a pre-determined wireless communication protocol, as described above.

SDM 102 of FIGS. 11A and 11B may function in much the same manner as the SDM described above in connection with FIGS. 1-9. For example, SDM 102 of FIGS. 11A and 11B may include computer readable SDM instructions which when executed by a processor (e.g., processor 1102) cause the processor to perform SDM functions consistent with the present disclosure. In some embodiments execution of the SDM instructions by a processor may cause mobile computing device 1101 to render a graphical user interface (GUI) and/or web based graphical user interface (WBGUI) on display 1105, e.g., in the same manner as the graphical user interface and web based graphical user interface of FIGS. 3, 5, 6, and 8. Likewise, SDM 102 may include machine readable GUI instructions for the production of a GUI and/or WBGUI on display 1105, which may be used display an image of a graph under consideration, display an optional reporting area for raw data extracted from the graph, etc. as previous described.

In addition to producing a GUI, SDM 102 of FIGS. 11A and B may utilize positional information received in communications from COMMS 1005 of attachment 1001 to analyze a graph in much the same manner as the SDM described above in connection with FIGS. 1-9. For example, SDM 102 of FIGS. 11A and B may use positional information in communications from attachment 1001 to determine one or more scaling factors, establish one or more reference points, determine pixel coordinates (i.e., convert positional data from SR 1003 to pixel coordinates of display 1105), convert pixel coordinates to raw data values, combinations thereof, and the like. Similarly, optional analysis module (AM) 103 of FIGS. 11A-B may perform the same or similar functions as the optional analysis module described above in connection with FIGS. 1-9.

For the purposes of clarity only, the present disclosure will now describe an example wherein data is extracted from a known psychrometric chart (e.g., the chart of FIG. 4) using system 1100. In this regard, reference is made to FIG. 12, which depicts the use of system 1100 to extract information from chart 1209.

To extract data, a digital image 1203 of chart 1209 was made provided to mobile computing device 1101. Image 1203 may be in any suitable format, such as the image formats previously described. In some embodiments, image 1203 of chart 1209 may be obtained using one or more sensors of mobile computing device 1101, such as a camera (not shown). Once image 1203 is provided to mobile computing device 1101, system 1100 may be moved over the surface of chart 1209. As system 1100 is moved, sensor resources (SR) 1003 of attachment 1001 may detect the location and/or motion of system 1100 relative to chart 1209, and produce signals including positional data indicative of such location and/or relative movement, as previously described. The positional data may be transmitted to mobile computing device 1101 by COMMS 1005, as described above.

Once the positional data is provided to mobile computing device 1101, SDM 102 may process the data to extract information from chart 1209 in the same manner as described above in connection with FIG. 3-6. For example, SDM 102 when executed on mobile computing device 1101 may cause the production of a graphical user interface (GUI) (not labeled) on display 1105. The GUI may include rendering area 1201, which may include image 1203 of chart 1209, as well as digital pointer 1204. The nature and function of digital pointer 1204 is the same as that of digital pointer 304 of FIG. 3, and thus is not described again here. The GUI may also include optional reporting area 1202, which may function in the same manner as the optional reporting areas described above in connection with FIGS. 3, 5, 6, and 8.

More specifically, SDM 102 may include instructions that when executed may cause mobile computing device 1101 to determine the length of the axes of graph 1209, determine appropriate scaling factors which may be applied to convert the pixel coordinates of digital pointer 1204 to raw data values of graph 1209, and to optionally report such data values in optional reporting area 1202. The execution of these functions is the same as previously described in connection with FIGS. 1-9, and thus is not reiterated here.

From the foregoing description, it may be appreciated that the attachments described herein may enable a mobile computing device to analyze graphs and three dimensional objects in a manner consistent with the present disclosure. While the use of such attachments for such purposes is particularly of interest, the attachments described herein are not limited to such use. Indeed, the attachments described herein may also enable a mobile computing device to serve as an input device for another computing device, such as but not limited to a desktop computer. For the sake of discussion, an input device that includes an attachment and a mobile computing device is referred to herein as a "composite input device."

Figure 13:
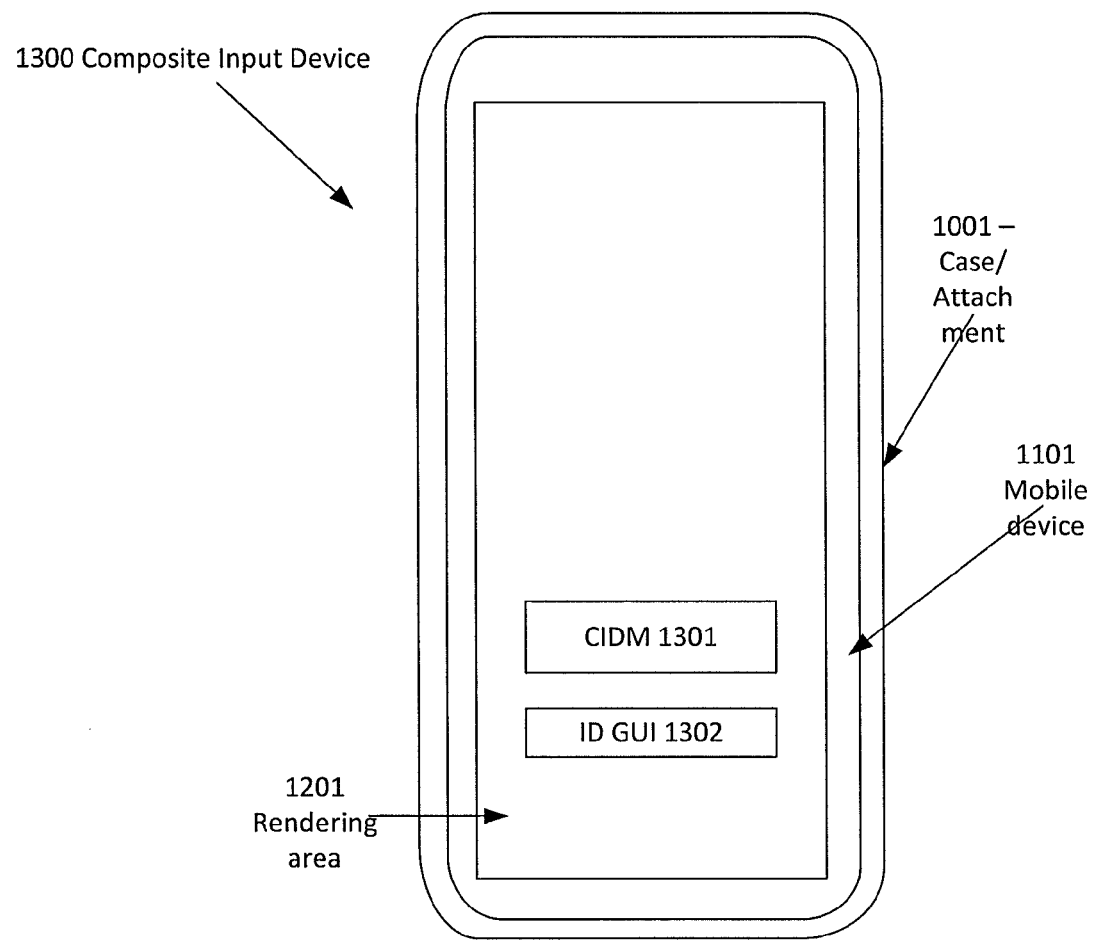
FIG. 13 illustrates an exemplary combined input device consistent with the present disclosure.

To illustrate this concept reference is made to FIG. 13, which depicts an exemplary composite input device consistent with the present disclosure. As shown, composite input device 1300 includes attachment 1001 and a mobile computing device 1301. The nature and function of attachment 1001 is the same as described above in connection with FIGS. 10A-12, and so are not reiterated in detail here. In general, attachment 1001 includes an input module that is operable to provide information regarding the physical position and/or movement of attachment 1001 to mobile computing device 1301.

Mobile computing device 1301 of FIG. 13 may include the same or similar components as described above in connection with mobile computing device 1101 of FIG. 11A. That is, mobile computing device 1301 may include a processor, memory, communications resources and a display, all not shown. Alternatively or in addition to a synchronization and display module, the memory of mobile computing device 1301 may include a composite input device module (CIDM) 1302. CIDM 1302 may include computer readable instructions which when executed by a processor (e.g., of mobile computing device 1301 or otherwise) may cause mobile computing device to perform composite input device functions consistent with the present disclosure. For example, the CIDM instructions when executed may cause mobile computing device 1301 to relay information received from attachment 1001 to another computing device (not shown), via wired and/or wireless communication. Without limitation, the CIDM instructions when executed preferably cause mobile computing device 1301 to relay information received from attachment 1001 to its communications hardware, which may wirelessly transmit such information to another computing device using a pre-determined wireless communication protocol.

In this way, composite input device 1300 may provide raw positional and/or movement data to another computing device, which may include resources (e.g., libraries, drivers, applications etc.) which can apply that information to cause a digital pointer to move in an appropriate manner.

As further shown in FIG. 13, mobile computing device 1301 may further include an input device graphical user interface module (IDGUIM) 1303. In general, IDGUIM 1303 may include computer readable instructions which when executed by a processor may cause mobile computing device 1301 to produce an input device graphical user interface (ID GUI) on a display (not labeled thereof). In the general, the ID GUI may provide an interface for performing input device functions. For example, the ID GUI may be configured to display one or more buttons, user interface elements, etc., which in response to user interaction may cause mobile computing device to perform one or more actions. In some embodiments, IDGUIM 1303 when executed causes mobile computing device 1301 to display an ID GUI that includes one or more virtual mouse buttons, which when interacted with by a user cause mobile computing device 1101 to send a signal representative of a mouse "click" to another computing device, such as a desktop computer. In this way, mobile computing device 1001 may simulate simple and/or complex functions of a traditional computer mouse or other input device.

Using a composite input device, data may be extracted from one or more graphs in much the same manner as previously described in connection with FIGS. 1-9. For example, a composite input device such as the one shown in FIG. 13 may be used to extract information from a psychrometric chart in much the same manner as previously described in connection with FIG. 6. This concept is illustrated in FIG. 13, which is identical to FIG. 6 except insofar as composite input device 1300 is used as an input device, instead of the computer mouse illustrated in FIG. 6 as input device 510.

While the description of FIGS. 10A-14 has focused on embodiments wherein an attachment to a mobile computing device includes sensor resources, processing resources, and communications resources that allow data to be communicated to a mobile phone, it should be understood that such embodiments are exemplary and the use of such an attachment is not required. Indeed as previously described, the input devices of the present disclosure may be in the form of a mobile computing device such as a smart phone, tablet personal computer, electronic reader, or the like. In such instances, it may be appreciated that the mobile computing device may itself include sensor resources, processing resources, and/or communications resources that allow it to perform the functions of an input device consistent with the present disclosure. For example, one embodiment of the present disclosure relates to a mobile computing device such as a smart phone that includes sensor resources that enable it to analyze graphs and/or physical bodies in the same manner as previous described above in connection with FIGS. 1-14. For example, the mobile computing device may include one or more sensors such as an optical sensor, accelerometer, GPS., etc., which may enable it to take optical and other measurements of graphs and physical bodies, as previously described.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system, comprising:
    a mobile computing device comprising a processor, a display, and a memory having a synchronization and display module (SDM) instructions stored therein; and
    an attachment for said mobile computing device, said attachment comprising a body configured to at least one of mechanically couple to said mobile computing device, mate with said mobile computing device, and envelop at least a portion of said mobile computing device, said attachment further comprising an input module; wherein:
    said input module comprises sensor resources, processing resources, communication resources, and computer readable input module instructions (IMI), wherein the IMI when executed by a processor of said processing resources cause said input device to perform the following operations comprising:
  detect positional information comprising at least one of a physical location and movement of said body with said sensor resources; and
  transmit at least a portion of said positional information to said synchronization and display module using said communication resources; and
said SDM instructions when executed by said processor cause said processor to perform the following functions comprising:
  in response to receiving said positional information, determine at least one scaling factor for one or more dimensions of a first graph or physical body, said at least one scaling factor corresponding to the number of pixels a digital pointer moves in response to movement of said attachment by a physical length of a unit of said first graph or physical body;
  extract data from said first graph or physical body by applying said at least one scaling factor to convert pixel coordinates of said digital pointer to data of said first graph or physical body; and
  cause a graphical user interface to appear on said display, said graphical user interface comprising a rendering area;
wherein said digital pointer is displayed within said rendering area.

2. The system of claim 1, wherein said body is configured as a case for said mobile computing device.

3. The system of claim 1, wherein said sensor resources include at least one sensor selected from the group consisting of a rotary position sensor, optical sensor, infrared sensor, touch sensor, and pressure sensor.

4. The system of claim 1, wherein said communication resources are configured to transmit said positional information using at least one of wired and wireless communication.

5. The input device of claim 4, wherein said communication resources are configured to wirelessly transmit said positional information to said mobile computing device.

6. The system of claim 1, wherein said SDM instructions when executed by said processor further cause said processor to determine the total length in pixels of at least one axis of said first graph.

7. The system of claim 1, wherein said SDM instructions when executed further cause said processor to display an image of said first graph or physical body within said rendering area.

8. The system of claim 7, wherein said SDM instructions when executed further cause said processor to identify one or more reference points within said rendering area, and correlate said one or more reference points with one or more selected points on said first graph or physical body.

9. The system of claim 1, wherein said first graph is in printed or electronic form.

10. The system of claim 1, wherein said SDM instructions when executed further cause said processor to determine data values of a second graph based at least in part on data extracted from said first graph.

11. The system of claim 10, wherein said second graph is in printed or electronic form.

12. The system of claim 11, wherein said first graph and said second graph comprise at least one common axis.

13. A method, comprising:
  determining positional information comprising at least one of a physical location and a movement of a mobile computing device with sensor resources of an attachment to a mobile computing device, said attachment comprising a body configured to at least one of mechanically couple to said mobile computing device, mate with said mobile computing device, and envelop at least a portion of said mobile computing device;
  transmitting at least a portion of said positional information to a synchronization and display module of said mobile computing device;
  determining at least one scaling factor for one or more dimensions of a first graph or physical body with said mobile computing device computing device, said at least one scaling factor corresponding to the number of pixels a digital pointer moves in response to movement of said attachment by a physical length of a unit of said first graph or physical body;
  converting with said at least one scaling factor pixel coordinates of said digital pointer to data of said first graph or physical body; and
  displaying an image of said first graph or physical body within a rendering area.

14. The system of claim 13, wherein said body is configured as a case for said mobile computing device.

15. The system of claim 13, wherein said sensor resources include at least one sensor selected from the group consisting of a rotary position sensor, optical sensor, infrared sensor, touch sensor, and pressure sensor.

16. The method of claim 13, further comprising determining the total length in pixels of at least one axis of said first graph.

17. The method of claim 16, wherein said computing device further comprises a display, the method further comprising:
  displaying a graphical user interface on said display, said graphical user interface comprising a rendering area;
  displaying said digital pointer within said rendering area.

18. The method of claim 13, further comprising identifying one or more reference points within said rendering area, and correlating said one or more reference points to one or more selected points on said first graph or physical body.

19. The method of claim 13, wherein said first graph is in printed or electronic form.

20. The method of claim 13, further comprising determining data values of a second graph based at least in part on data extracted from said first graph.

21. The method of claim 13, wherein said second graph is in printed or electronic form.

22. The method of claim 21, wherein said first graph and said second graph comprise at least one common axis.

23. A system, comprising:
  a mobile computing device comprising a processor and a memory having a synchronization and display module (SDM) instructions stored therein; and
  an attachment for said mobile computing device, said attachment comprising a body configured to at least one of mechanically couple to said mobile computing device, mate with said mobile computing device, and envelop at least a portion of said mobile computing device, said attachment further comprising an input module; wherein:
  said input module comprises sensor resources, processing resources, communication resources, and computer readable input module instructions (IMI), wherein the IMI when executed by a processor of said processing resources cause said input device to perform the following operations comprising:

detect positional information comprising at least one of a physical location and movement of said body with said sensor resources; and transmit at least a portion of said positional information to said synchronization and display module using said communication resources; and said SDM instructions when executed by said processor cause said processor to perform the following functions comprising:

in response to receiving said positional information, determine at least one scaling factor for one or more dimensions of a first graph or physical body, said at least one scaling factor corresponding to the number of pixels a digital pointer moves in response to movement of said attachment by a physical length of a unit of said first graph or physical body;

extract data from said first graph or physical body by applying said at least one scaling factor to convert pixel coordinates of said digital pointer to data of said first graph or physical body; and determine data values of a second graph based at least in part on data extracted from said first graph.

24. A method, comprising:

determining positional information comprising at least one of a physical location and a movement of a mobile computing device with sensor resources of an attachment to a mobile computing device, said attachment comprising a body configured to at least one of mechanically couple to said mobile computing device, mate with said mobile computing device, and envelop at least a portion of said mobile computing device;

transmitting at least a portion of said positional information to a synchronization and display module of said mobile computing device;

determining at least one scaling factor for one or more dimensions of a first graph or physical body with said mobile computing device computing device, said at least one scaling factor corresponding to the number of pixels a digital pointer moves in response to movement of said attachment by a physical length of a unit of said first graph or physical body;

converting with said at least one scaling factor pixel coordinates of said digital pointer to data of said first graph or physical body;

identifying one or more reference points within a rendering area; and correlating said one or more reference points to one or more selected points on said first graph or physical body.

* * * * *